United States Patent
Wu et al.

(10) Patent No.: US 8,488,714 B2
(45) Date of Patent: Jul. 16, 2013

(54) HIERARCHICAL MODULATING METHOD AND TRANSMITTER PERFORMING HIERARCHICAL MODULATION

(75) Inventors: Jianming Wu, Kawasaki (JP); Kazuhisa Obuchi, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 903 days.

(21) Appl. No.: 12/557,641

(22) Filed: Sep. 11, 2009

(65) Prior Publication Data

US 2010/0086064 A1 Apr. 8, 2010

(30) Foreign Application Priority Data

Oct. 7, 2008 (JP) .................. 2008-260758

(51) Int. Cl.
*H04L 27/00* (2006.01)
(52) U.S. Cl.
USPC .......................................... 375/295; 375/259
(58) Field of Classification Search
USPC .................. 375/259, 295, 340, 100
See application file for complete search history.

(56) References Cited

U.S. PATENT DOCUMENTS

| | | |
|---|---|---|
| 2005/0164740 A1 | 7/2005 | Yoshii et al. |
| 2007/0195809 A1* | 8/2007 | Blanz et al. .................... 370/426 |
| 2009/0003486 A1* | 1/2009 | Kwon et al. .................. 375/299 |
| 2010/0027902 A1* | 2/2010 | Yang et al. ..................... 382/239 |
| 2010/0046451 A1* | 2/2010 | Tada et al. ..................... 370/329 |

FOREIGN PATENT DOCUMENTS

JP 2004-40661 2/2004

OTHER PUBLICATIONS

J.G. Proakis, "Digital Communications", 1995, 3rd Edition, McGraw-Hill.
3GPP TR 25.814 v7.0.0 (Jun. 2006), Technical Report, "3rd Generation Partnership Project; Technical Specification Group Radio Access Network; Physical Layer Aspects for Evolved Universal Terrestrial Radio Access (UTRA)" (Release 7).
Andrea Goldsmith, "Wireless Communications", Cambridge University Press 2005.

* cited by examiner

*Primary Examiner* — Daniel Washburn
*Assistant Examiner* — Brian J Stevens
(74) *Attorney, Agent, or Firm* — Katten Muchin Rosenman LLP

(57) ABSTRACT

A modulation mapper selects respective data blocks (DBs) hierarchically and sequentially in a descending order of a transmission power ratio control by a gain multiplexer; decides, from a resource element group, unused REs to which modulation symbols can be allocated; and decides the allocation of modulation symbols in the REs. A channel resource element mapper performs the mapping of modulation symbols of the respective DBs to the REs on the basis for the decided allocation. A complex-value transmission signal is generated from the group of REs.

8 Claims, 23 Drawing Sheets

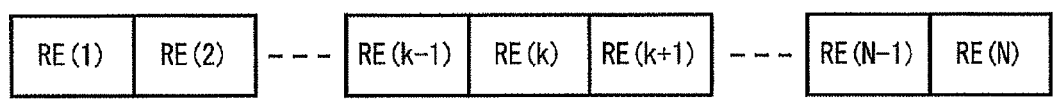
F I G. 1

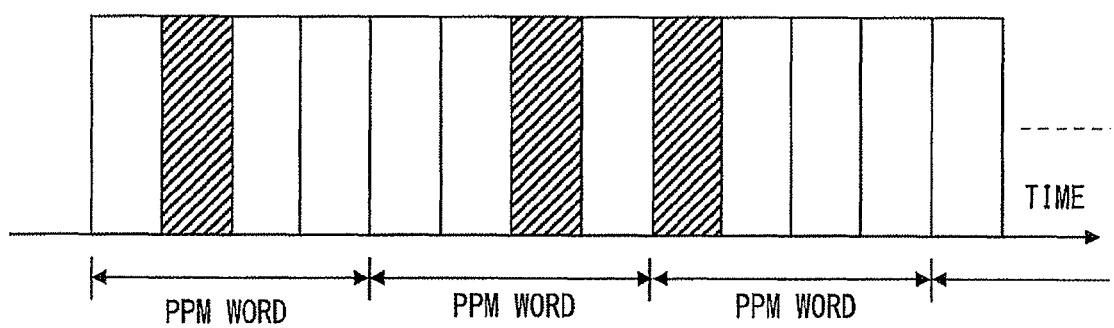
F I G. 2

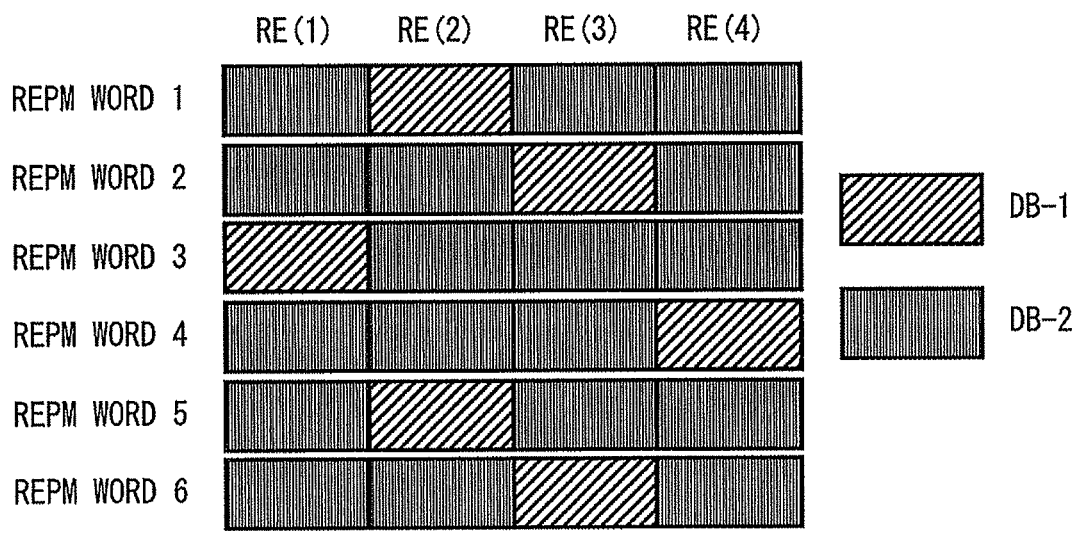
F I G. 3

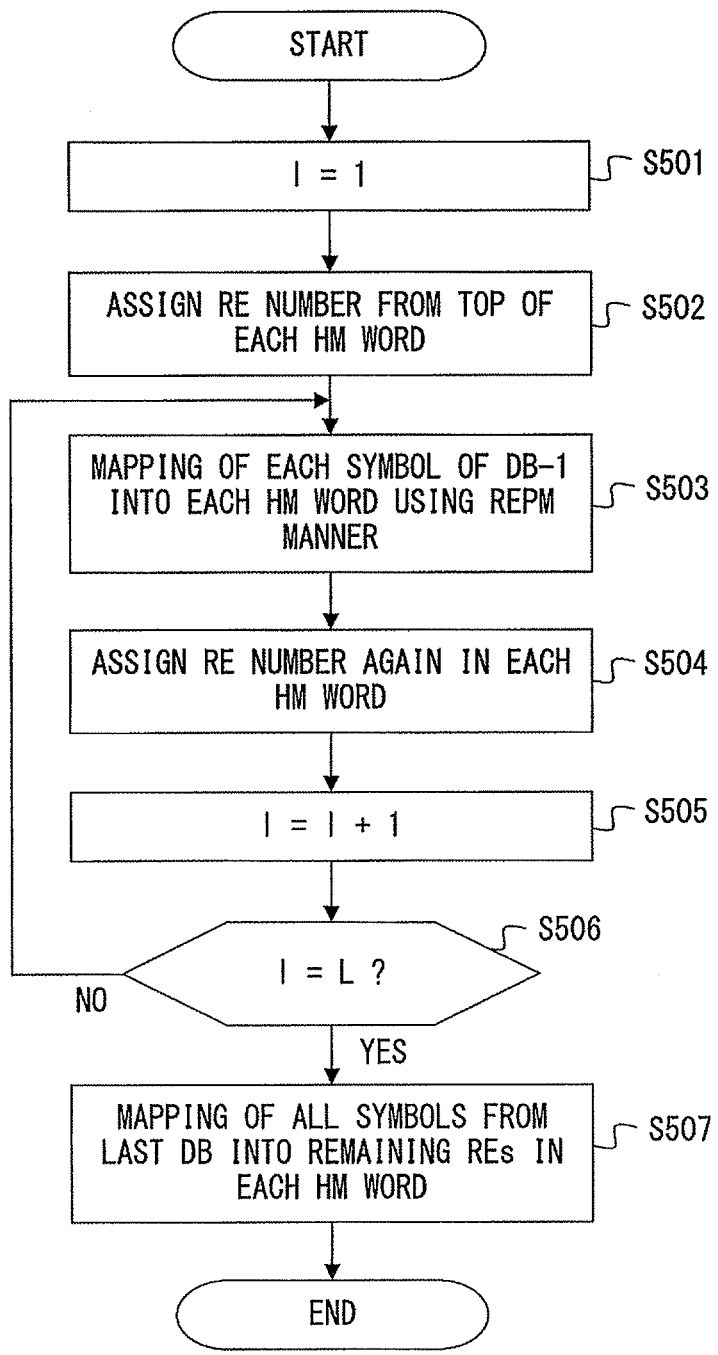
F I G. 5

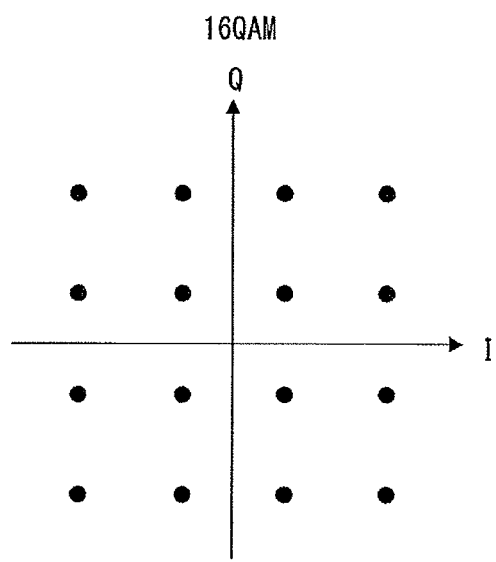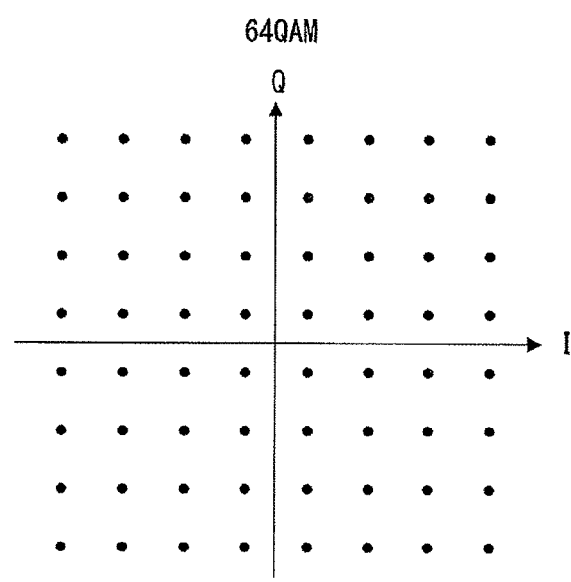
F I G. 1 6 A　　　　F I G. 1 6 B

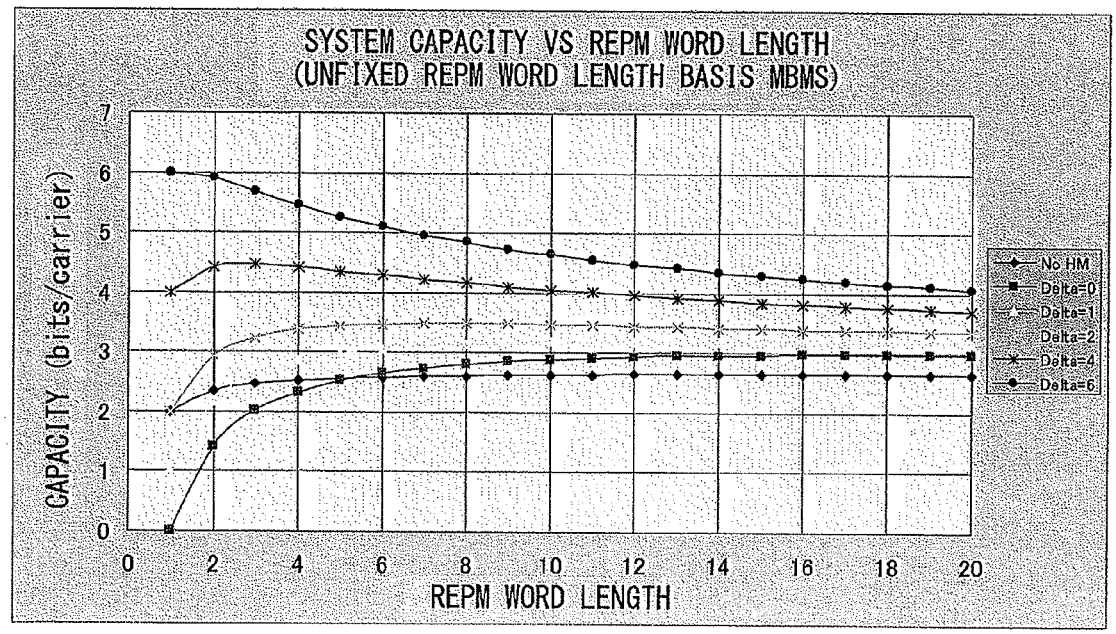
F I G. 2 2

HIERARCHICAL MODULATING METHOD AND TRANSMITTER PERFORMING HIERARCHICAL MODULATION

CROSS-REFERENCE TO RELATED APPLICATION

This application is based upon and claims the benefit of priority of the prior Japanese Patent Application No. 2008-260758, filed on Oct. 7, 2008, the entire contents of which are incorporated herein by reference.

FIELD

The present invention relates to a modulation system. The present invention may be used for, for example, the Multimedia Broadcast Multicast Service (MBMS) that cooperates with a unicast service.

BACKGROUND

In telecommunications, modulation is one of most important processes, which varies a periodic waveform, where a message can be conveyed by usually changing some parameters of a sine wave such as amplitude, phase, and frequency. All of these parameters can be modified in accordance with a low frequency information signal to obtain the modulated signal. There are many ways to modulate a signal: amplitude modulation (AM), frequency modulation (FM), phase modulation (PM), and pulse modulation (PM). Among the modulations, PM is the most common modulation scheme and is able to be further classified into pulse amplitude modulation (PAM), pulse code modulation (PCM), pulse frequency modulation (PFM), pulse position modulation (PPM), and pulse width modulation (PWM).

In order to increase the number of modulation dimensions, a well-known modulation scheme so called multidimensional signal modulation can be used to construct signal waveforms corresponding to higher-domain. The higher-domain may rely on either the time domain or the frequency domain or both.

In recent telecommunication standards such as in 3GPP, 3GPP2, and 802.16, the most common uses of modulation is quadrature amplitude modulation (QAM) whereby an adaptive modulation and channel coding (AMC) scheme can be easily employed in order to aim in improving the overall system performance in accordance with the experienced channel condition by the receiver in time, frequency, or spatial domain.

However, all modulation schemes like QAM convey data by changing some aspect of a carrier signal, or the carrier wave, (usually a sinusoid) in response to a data signal. In the most application, the modulation mechanism is unvaried; for example, mechanism between PPM and QAM is not changed or not combined. Even with AMC scheme, it only varies the modulation order, such as from quadrature phase shift keying (QPSK) to 16QAM or to 64QAM, and vice versa.

Although many efforts were put to optimize the adaptation with existing modulation methods so far, the conventional approaches that improve individual methods had a problem that they limit the overall system performance.

SUMMARY

An example of an embodiment related to a modulation method used when mapping a modulation symbol obtained by modulating transmission information into a resource element that is a physical channel unit, generating a transmission signal from a resource element group of a predetermined number of resource elements for which the mapping has been performed, and generating and transmitting a transmission output signal by performing, for the transmission signal, signal processing based on a predetermined communication scheme, the modulating method including;

extracting transmission information from each of a plurality of data blocks that respectively transmit transmission information from independent information sources, and generating a modulation symbol by performing modulation for the extracted transmission information using a predetermined modulation scheme for the respective data blocks;

controlling a transmission power of the modulation symbol generated for the respective data blocks at a transmission power ratio decided between the respective data blocks;

sequentially selecting the respective data blocks hierarchically in a descending order of the transmission power ratio and deciding, based on a value of the modulation symbol that has been obtained for the selected data block, an unused resource elements to which the modulation symbol can be allocated among the resource element group, and performing decision of an allocation of the modulation symbol within the decided resource elements; and mapping the modulation symbol that has been obtained for the respective data blocks into the resource element group, based on the decided allocation.

Meanwhile, an example of an embodiment related to a de-modulating method is a de-modulating method used when receiving a signal generated and transmitted by mapping a modulation symbol obtained by modulating transmission information extracted from each of a plurality of data blocks respectively transmitting transmission information from independent information sources into a resource element group of predetermined number of resource elements that are physical channel units, the mapping being performed hierarchical in a descending order of a transmission power ratio for each of the data blocks and generating a transmission output signal based on the resource element group; extracting and converting into a discrete-time reception signal, a communication signal component from the received signal; and demodulating and decoding the discrete-time reception signal; said de-modulating method including;

converting the discrete-time reception signal into a reception energy signal that indicates an energy of the signal; performing a data block detection process for detecting to which of the plurality of data blocks each of the resource elements correspond to, by judging the reception energy signal for each of the resource elements obtained from the discrete-time reception signal; and performing a demodulation process with respect to the discrete-time reception signal corresponding to a resource element that corresponds to each of the data blocks detected in the data block detection process.

The object and advantages of the embodiment will be realized and attained by means of the element and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating a configuration example of resource elements.

FIG. 2 illustrates an example, using classical PPM modulation manner with PPM word length M=4.

FIG. 3 illustrates an example in which the REPM word length is M=4 and DB-1 and DB-2 are mapped in an REPM word.

FIG. 5 is an operation flowchart illustrating a modulation process based on HM with equal HM length.

FIG. 16A is a diagram describing a signal constellation of 16QAM.

FIG. 16B is a diagram describing a signal constellation of 64QAM.

FIG. 22 is a diagram illustrating the characteristics of overall system capacity with respect to REPM word length for MBMS with unfixed REPM.

DESCRIPTION OF EMBODIMENTS

Figure 4:
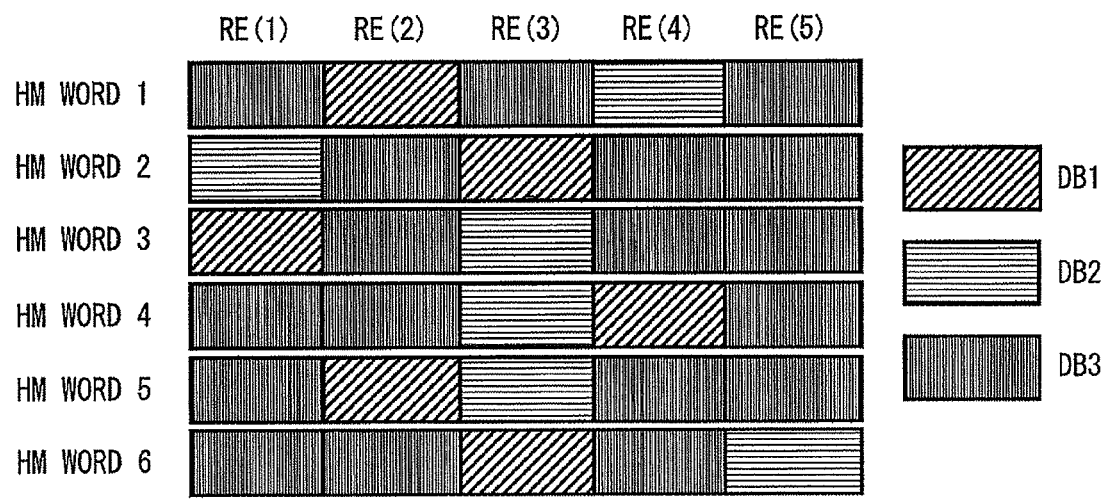
FIG. 4 illustrates an example of HM with the number of DB=3, and the REPM word length=4, for data blocks DB1, DB2, and DB3.

Hereinafter, the embodiment is described with reference to the drawings.

In the embodiment, some data symbols are modulated by a first modulation manner such as position based modulation in some channel elements while some data symbols are hierarchically modulated by a second modulation manner in other channel elements.

<Resource Element, Data Block, Resource Element Position Modulation Word, Hierarchical Modulation Word, and Index of Modulation Symbol>

The resource element, data block, resource element position modulation word, hierarchical modulation word, and index of modulation symbol that are to be mentioned in the embodiment are explained below.

Resource Element (RE):

Resource element (RE) is defined as a smallest physical channel unit, which is used to map a complex-valued modulation symbol associated with QPSK, 16QAM and 64QAM. RE may consist of a channel unit in either time domain (a pulse), or frequency domain (a carrier), or code domain (a Walsh code), or spatial domain (a beam), or their combination. FIG. 1 is a diagram illustrating a configuration example of the resource elements.

Data Block (DB):

Data block (DB) is defined as a transmission unit containing a number of bits as transmit information. A data block could be interpreted as different meanings in case of some practical uses are accounted for. For example, when a Node-B transmits multiple transport blocks to multiple users, a data block may be interpreted as a transport block for each user. Alternatively, we may indicate a data block as a code block consisting of a transport block.

Resource Element Position Modulation Word (REPM):

Resource element position modulation (REPM) is a modulation scheme using similar concept of multidimensional signal modulation but performed in a resource element. REPM word with the length of M (M-dimensional signal) consisting of M elements is defined as a modulation word containing all M-ary possible phases. Each REPM word conveys one symbol extracted from DB (data block). With X-QAM which provides modulation order of δ (δ=0 for PPM, δ=1 for BPSK, δ=2 for QPSK, δ=4 for 16QAM, and δ=6 for 64QAM), one REPM word may convey δ+log$_2$(M) information bits from DB.

Hierarchical Modulation Word (HM):

Hierarchical modulation (HM) is defined as a modulation scheme, hierarchically multiplexing multiple symbols by means of REPM. HM word is defined as a modulation word with the length of H, where H=M+L−2, L is the number of DBs, and M is REPM word length. HM word contains L−1 REPM words, and always ensures that L−1 symbols from L−1 DBs can be hierarchically modulated and mapped on L−1 REPM each with M-ary possible phases. The REPM word depending on contents of previous DB symbols is a sub-set of HM word, and H=M only when L=2 as a special case.

Index of Modulation Symbol:

The index of modulation symbol Γ is defined as a number which is calculated from modulation symbol based on the following rule;

Without Gray encoding as the modulation symbol, the index of the modulation symbol is defined by the following equation.

$$\Gamma = 1 + \sum_{k=1}^{K} \alpha_k \cdot 2^{k-1} \qquad (1)$$

where $(\alpha_1, \alpha_2, \ldots, \alpha_K)$ is the modulation symbol, $\alpha_K$ is the source bit with $\{0, 1\}$, and K=log$_2$(M).

With Gray encoding as the modulation symbol, the index of modulation symbol depending on the modulation word length M is listed in Table 1 with M=4 and 8, in which the adjacent signals amplitudes differ by one binary digit.

TABLE 1

| Word Length | Modulation Symbol | Index, Γ |
|---|---|---|
| 4 | 00 | 1 |
|   | 01 | 2 |
|   | 11 | 3 |
|   | 10 | 4 |
| 8 | 000 | 1 |
|   | 001 | 2 |
|   | 011 | 3 |
|   | 010 | 4 |
|   | 110 | 5 |
|   | 111 | 6 |
|   | 101 | 7 |
|   | 100 | 8 |

The index of modulation symbol is utilized to determine the RE position in the word of M-ary REPM word.

<Hierarchical Modulation Scheme>

Hierarchical modulation (HM) scheme is to hierarchically multiplex multiple symbols in single HM word by means of multiple classical modulation schemes. In the scheme proposed in the embodiment, data symbols are modulated by one modulation manner such as resource element position modulation (REPM) in some channel elements while data symbols are hierarchically modulated by another modulation manner in the other remaining channel elements.

The concept of the proposed modulation scheme is described by the three scenarios.

Scenario-I: Send single DB by means of classical modulation manner.

Scenario-II: Send double DBs by means of the proposed hierarchical modulation scheme.

Scenario-III: Send L DBs by means of the proposed hierarchical modulation scheme for general case.

To describe explicitly step by step, the three scenarios are explained in order.

Modulation for Signal Data Block Transmission (Scenario-I)

Thanks to single DB transmission, a classical modulation scheme can implemented by means of any modulations, such as AM, FM, PM, PAM, PCM, PFM, PPM, and PWM.

FIG. 2 illustrates an example, using classical PPM modulation manner with PPM word length, i.e., the specified position in each word, M=4 and each conveying two source bits in time domain. In the example, each modulation symbol from a DB is transmitted as the position in one PPM word, such as 01' '10' '00' . . . starting from the left in FIG. 2.

Modulation for Double Data Block Transmission (Scenario-II)

In this scenario, it as assumed that there are two DBs (denote DB-1 and DB-2) which need to be transmitted to one receiver or to two receivers). It is further assumed that the HM word length is fixed, and all the symbols from two DBs are mapped on N REs by means of the HM scheme according to the embodiment. The procedure of the proposed HM scheme includes the following two steps.

Step 1: The modulation symbol from DB-1 is modulated using REPM manner with REPM word length of M and modulation order of δ=0. In this case, a set of modulation symbols is delivered from DB-1 with log$_2$(M) bits using one RE.

Step 2: The modulation symbol from DB-2 is modulated using BPSK. The resultant BPSK symbols are mapped into (M−1) REs that were not occupied in step 1 in each REPM word.

Here, the transmission power for DB-1 symbols is higher than that for DB-2 to some extent, the extent depending on how much the received signal is contaminated by noise or interference. This gives the maximum capacity in terms of bits per RE $$C = \frac{\log_2(M) + (M-1)}{M} \quad (2)$$

where the value C may be much larger than 1, by BPSK modulation only, particularly when the M becomes large.

FIG. 3 illustrates an example in which the REPM word length is M=4 and DB-1 and DB-2 are mapped in the REPM word as described in Table 2.

The modulation symbols of transmission data from the data block having data block index=1 (DB-1) is modulated using REPM manner with REPM word length of M and modulation order of δ=0. In these modulation symbol, the first word is '01', the second word is '10', the third word is '00', the fourth word is '11', the firth word is "01", and the sixth word is '10'. The indices for these modulation symbols are 1, 2, 0, 3, 1, 2, respectively. In this case, the modulation symbol for the first word is mapped into the second RE, i.e., RE(2), the second word into RE(3), the third word into RE(1), the fourth word into RE(4), the firth word into RE(2), and the sixth word into RE(3).

TABLE 2

| Data Block Index | Transmission Data | Index of Modulation Symbol |
|---|---|---|
| 1 | '01' '10' '00' '11' '01' '10' | 1, 2, 0, 3, 1, 2 |
| 2 | NA | NA |

The modulation symbols of transmission data from the data block (DB-2) having the data block index=2 are transmitted as BPSK symbols in accordance with step 2 mentioned above. As illustrated in FIG. 3, these symbols are mapped into (M−1=3) REs that were not occupied in step 1 in each REPM word. The first word is mapped into an RE other than RE(2), the second word into an RE other than RE(3), the third word into an RE other than RE(1), the fourth word into RE other than RE(4), the firth word into an RE other than RE(2), and the sixth word into an RE other than RE(3).

Modulation for L Data Block Transmission (Scenario-III)

In this scenario, all the symbols from L DBs are mapped on N REs by means of an HM scheme. Also, it is assumed that the length of the HM word is fixed as H. The procedure of this proposed modulation is as follows:

Step 1: The value of l is set as l=1. In each HM word, an RE number is assigned sequentially from the first one to the last one, starting from 1.

Step 2: Each symbol from DB-1 is mapped into one of the RE group for which the RE index number is assigned in each HM word, using the REPM manner until all the symbols from the DB-1 are completely mapped. More specifically, each symbol is mapped into an RE having the RE number assigned in each HM word corresponding to the index value of each symbol+1.

Step 3: The RE numbers are renumbered after removing the REs which are already occupied by the symbols from the previous DBs and assigning RE numbers from 1 to the remaining REs in each HM word.

Step 4: The value of l is set as l=l+1, and the operations in the step 2 and step 3 are repeated.
Step 5: The operations from step 2 to step 4 are repeated until the value of l becomes l=L−1. When the value reaches l=L, step 6 is performed.
Step 6: all the symbols from the last DB are mapped into the remaining (M−1) REs numbered in each HM word.
The transmission power between DBs follows the rule:

$$P_1 > P_2 > \ldots P_L \quad (3)$$

where $P_l$ is the transmission power for the l-th DB.
The scheme provides the maximum capacity in terms of bits per RE $$C = \frac{(L-1) \cdot \log_2(M) + (H - L + 1)}{H} \quad (4)$$

where the value C may be much larger than 1, by BPSK modulation only, particularly when the M becomes large.

Obviously, the capacity achieved by HM is derived under the ideal channel conditions, meaning that the noise level is significantly low as opposed to the data signal. The optimization of how to design the value of M under the practical conditions will be described later.

FIG. 4 illustrates an example of HM with the number L of DB=3, and the REPM word length M=4, for data blocks DB1, DB2, and DB3 each having transmission data as listed in Table 3.

TABLE 3

| Data Block Index | Transmission Data | Index of Modulation Symbol |
|---|---|---|
| 1 | '01' '10' '00' '11' '01' '10' | 1, 2, 0, 3, 1, 2 |
| 2 | '10' '00' '01' '10' '01' '11' | 2, 0, 1, 2, 1, 3 |
| 3 | NA | NA |

Assuming the number of DBs as L and the REPM word length required for conveying the modulation symbol of each DB as M elements, the HM word length H required for the HM (hierarchical modulation) is, as described in the definition of HM, H=M+L−2=4+3−2=5 elements. In other words, as illustrated in FIG. 4, each of the HM words 1-6 consists of 5 resource elements {RE(1), RE(2), RE(3), RE(4), RE(5)}.

Then, focusing on DB1 first, a modulation symbol from DB1 is mapped into an RE at a given position in the group (described as "RE 1, 2, 3, 4" in Table 4) of the first four (M=4) elements {RE(1), RE(2), RE(3), RE(4)} in each HM word in accordance with the index value of the modulation symbol following step 1 mentioned above as illustrated in FIG. 4 and Table 4.

TABLE 4

| HM Word | REPM Word for DB1 | REPM Word for DB2 |
|---|---|---|
| 1 | RE 1, 2, 3, 4 | RE 1, 3, 4, 5 |
| 2 | RE 1, 2, 3, 4 | RE 1, 2, 4, 5 |
| 3 | RE 1, 2, 3, 4 | RE 2, 3, 4, 5 |
| 4 | RE 1, 2, 3, 4 | RE 1, 2, 3, 5 |
| 5 | RE 1, 2, 3, 4 | RE 1, 3, 4, 5 |
| 6 | RE 1, 2, 3, 4 | RE 1, 2, 4, 5 |

In view of above, specifically, in HM word 1, the index of the modulation symbol '01' of the first transmission data of DB1 is 1, and the symbol is mapped into RE(2). In HM word 2, the index of the modulation symbol '10' of the second transmission data of DB1 is 2, and the symbol is mapped into RE(3). In HM word 3, the index of the modulation symbol '00' of the third transmission data of DB1 is 0, and the symbol is mapped into RE(1). In HM word 4, the index of the modulation symbol '11' of the fourth transmission data of DB1 is 3, and the symbol is mapped into RE(4). In HM word 5, the index of the modulation symbol '01' of the fifth transmission data of DB1 is 2, and the symbol is mapped into RE(2). In HM word 6, the index of the modulation symbol '10' of the second transmission data of DB1 is 2, and the symbol is mapped into RE(3).

Next, focusing on DB2, first, following step 2 described above, after removing REs that are already occupied by the symbols from the previous DB1, mapping is performed in HM word 1 into an RE at a given position in the group (described as "RE 1, 3, 4, 5" in Table 4) of the first four (M=4) elements {RE(1), RE(3), RE(4), RE(5)} excluding RE(2) in which the modulation symbol of DB1 has been mapped, as illustrated in FIG. 4 and Table 4. At this time, numbering is performed for the four (M=4) elements, the origin of the numbering being 1, as RE(1): number 1, RE(2): number 2, RE(3): number 3, RE(4): number 4. In the same manner, mapping is performed in HM word 1 into an RE at a given position in the group (described as "RE 1, 2, 4, 5" in Table 4) of the first four (M=4) elements {RE(1), RE(2), RE(4), RE(5)} excluding RE(3) in which the modulation symbol of DB1 has been mapped. At this time, numbering is performed for the four (M=4) elements, the origin of the numbering being 1, as RE(1): number 1, RE(2): number 2, RE(4): number 3, RE(5): number 4. HM words 3-6 are treated in the same way.

Next, following step 3 described above, each of the modulation symbols '10', '00', '01', '10', '01', '11' from DB-2 are mapped into a given RE in the group of the four (M=4) elements numbered for each HM word, in accordance with the index values 2, 0, 1, 2, 1, 3 respectively assigned to the modulation symbols. Specifically, in HM word 1, the first modulation symbol '10' of DB2 is mapped, in accordance with its index value 2, into the third resource element RE(4) in the element group {RE(1), RE(2), RE(4), RE(5)}. In HM word 2, the second modulation symbol '00' of DB2 is mapped, in accordance with its index value 0, into the first resource element RE(1) in the element group {RE(1), RE(2), RE(4), RE(5)}. Meanwhile, it should be noted that, as explained above, the origin of the modulation symbols is 0, while the origin of the positioning (numbering) of REs is 1. HM words 3-6 are treated in the same way.

Lastly, focusing on DB3, first, it is determined that (L−1)=(3−1)=2 DBs (DB1 and DB2) have been treated in accordance with the judgment in step 4 described above, all the modulation symbols from the last DB3 are transmitted as BPSK symbols and mapped into the remaining (M−1)=(4−1)=3 REs that are unoccupied in each HM word. Specifically, as illustrated in FIG. 4, in HM word 1, the first BPSK symbol from DB3 is mapped into the group of the remaining three elements {RE(1), RE(3), RE(5)}. In HM word 2, the second PBSK symbol from DB 3 is mapped into the remaining the group of the remaining three elements {RE(2), RE(4), RE(5)} HM words 3-6 are treated in the same way.

<General Hierarchical Modulation Scheme>
HM scheme with some simple scenarios using REPM with δ=0 for (L−1) DBs, and BPSK for last DB has been described. Hereinafter, the explanation is generalized for cases including various modulations using various DBs.
Hierarchical Modulation with Equal HM Word Length First, hierarchical modulation with a fixed HM word length is described.

The modulation used in each DB, in general, can be categorized into modulation schemes such as PPM, BPSK, QPSK, 16QAM and 64QAM. Assuming $\delta_{li}$ as the modulation order for the l-th DB and the i-th modulation index, $\delta_{l1}=0$, $\delta_{l1}=1$, $\delta_{l2}=2$, $\delta_{l4}=6$, represent PPM, BPSK, QPSK, 16QAM and 64QAM, respectively.

This procedure in the modulation process based equal HM word length is illustrated in the operation flowchart in FIG. 5.

First, the value of l is set as l=1 (step S501).

Next, an RE number is assigned sequentially from the first one to the last one, starting from 1, in each HM word (step S502).

Next, each symbol from DB-l is mapped using REPM manner into an RE at each position corresponding to each symbol value in the RE group for which the RE number is assigned in each HM, until all symbols from the DB are completely mapped (step S503).

Next, The RE numbers are renumbered after removing the REs which are already occupied by the symbols from the previous DBs and assigning RE numbers from 1 to the remaining REs in each HM word (step S504).

Next, the value of l is set as l=l+1 (step S505).

Next, judgment as to whether the value of l has reached l=L or not (step S506).

When the value of l is within the range from 1 to L−1 and the result of the judgment in step S506 is no, the process from step S503 to step S505 is repeated for DB1 to DB-L−1.

When the value of l reaches L and the result of the judgment in step S506 becomes YES, all the symbols from the last DB-L are mapped into each remaining RE in each HM word (step S507).

In the HM processing procedure illustrated as the operation flowchart in FIG. 5, the HM word length is fixed, and is equal to H=M+L−2. Each modulation symbol is guaranteed with the M-ary possible phases to convey $\delta_{li}+\log_2(M)$ bits per RE, where l=1, 2, . . . , L−1. The remaining number of REs in each HM word for the L-th DB modulation is M−1. Therefore, the capacity for the l-th DB (l=1, 2, . . . , L−1), and the capacity for the L-th DB (the last DB), respectively, are given by $$C_l = \begin{cases} \sum_{i=1}^{P} \alpha_{l,i}[\delta_{l,i} + \log_2(M)] & \text{for } l = 1, 2, \ldots, L-1 \\ \sum_{i=1}^{P} \alpha_{l,i}\delta_{l,i} & l = L \end{cases} \quad (5)$$

Here, $\alpha_{li}$ represents the probability with respect to the currently used modulation for the l-th DB and the i-th modulation index, and P is the maximum number of modulations. Therefore, $\alpha_{li}$ is given by the following equation:

$$\sum_{i=1}^{P} \alpha_{l,i} = 1 \quad (6)$$

The achievable overall capacity in each HM word can be expressed as $$C = \frac{(M-1) \cdot C_L + \sum_{l=1}^{L-1} C_l}{M + L - 2} \quad (7)$$

It is alternatively expressed in the simplified form as $$C = \frac{(L-1) \cdot \log_2(M) + (M-1)\Phi_L + \sum_{l=1}^{L-1} \Phi_l}{M + L - 2} \quad (8)$$

where $$\Phi_l = \sum_{i=1}^{P} \alpha_{l,i}\delta_{l,i} \quad (9)$$

It is preferable that when $\delta_{li}$ is 2, 4, and 6, Gray encoding in which the adjacent signals' amplitudes differ by one binary digit is used.

The optimum value for M can be obtained as follows by differentiating the above equation (8) with respect to M.

$$\frac{M+L-2}{M\ln 2} + \Phi_L = \log_2(M) + \frac{1}{L-1}\sum_{l=1}^{L-1}\Phi_l \quad (10)$$

For L=2 as a special case, the optimum value for M (REPM word length) is given by the following equation.

$$M|_{L=2} = 2^{\frac{1}{\ln 2} + \Phi_2 - \Phi_1} \quad (11)$$

The optimum value for M can be easily determined when REPM length for different DBs is the same.

Figure 6:
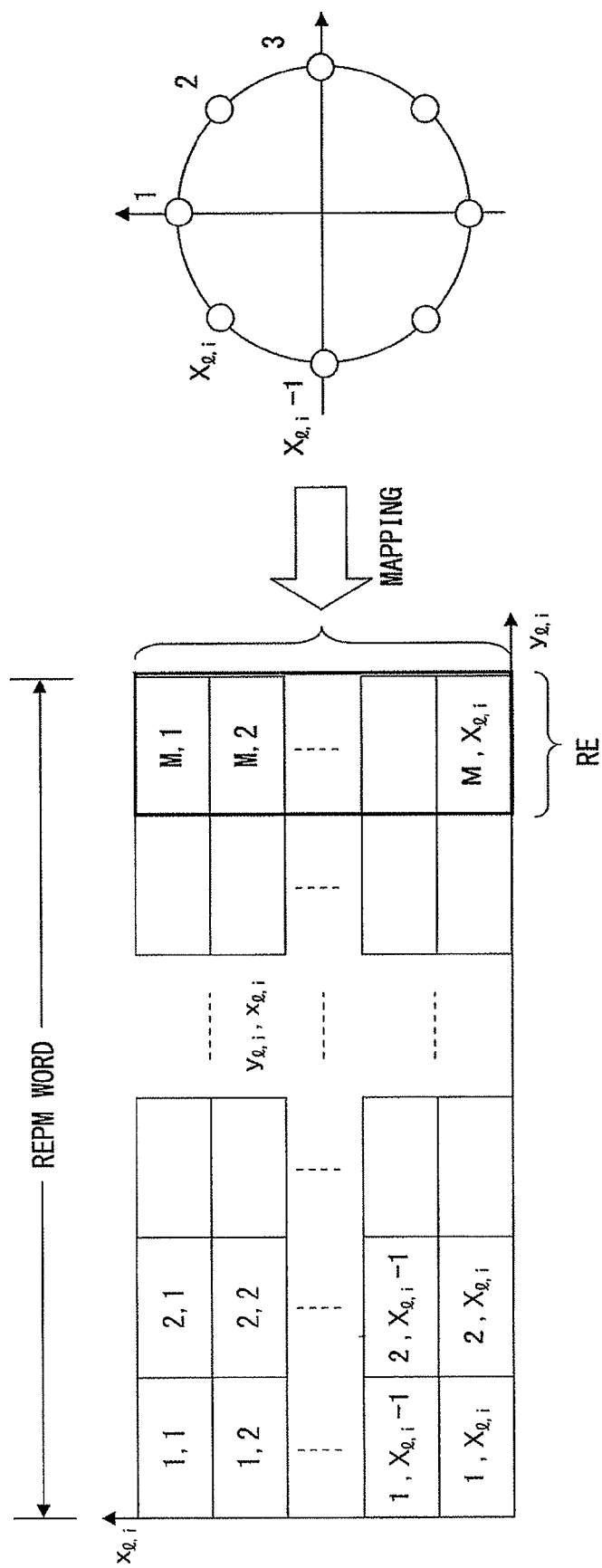
FIG. 6 is a diagram describing a mapping rule of a DB symbol into an REPM word.

The mapping rule of the DB symbol to the REPM word is defined as follows as illustrated in FIG. 6.

Take $\delta_{li}+\log_2(M)$ bits from the l-th DB based on the i-th order of modulation.

Calculate the index of modulation symbol (denoted as $\Gamma_{l,i}^{(H)}$) for $\delta_{li}+\log_2(M)$ bits, as defined in equation (1) and Table 1.

Determine the RE location for the modulation symbol according to the following equation (12)

$$y_{l,i} = \left\lceil \frac{\Gamma_{l,i}^{(H)}}{X_{l,i}} \right\rceil \quad (12)$$

where $X_{l,i}=2^{\delta_{li}}$ (13), and $\lceil a \rceil$ is the ceiling function that is defined as $$\lceil a \rceil = \min\{n \in R | a \leq n\} \quad (14)$$

As illustrated in FIG. 6, determine the position for the mapping in the allocated RE according to the possible phases that is expressed by the following equation (15).

$$x_{l,i} = (\Gamma_{l,i}^{(H)} \bmod X_{l,i}) \quad (15)$$

Th mapping rule relies on Gray encoding.

Figure 7:
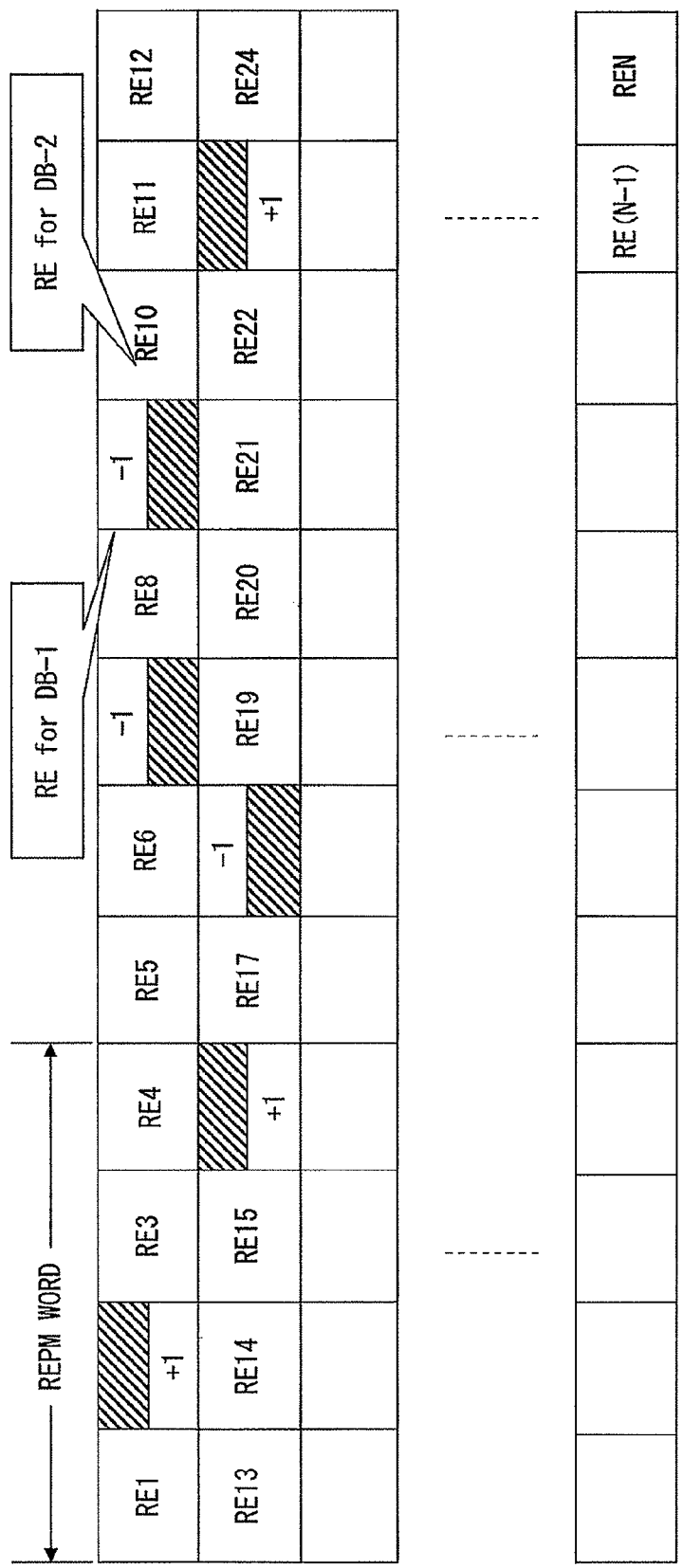
FIG. 7 illustrates an example of an HM where the number of DB L=2, REPM word length M=4.

FIG. 7 illustrates an example of an HM where the number of DB L=2, REPM word length M=4, HM word length H=M+L−2=4+2−2=4 (=REPM word number). Here, the modulation symbols of DB-1 are '010' '101' '001' '110' '011' '100', and BPSK modulation is assumed for DB-1. The indices of the respective modulation symbols are set as 3, 6, 2, 7, 4, and 5, according to the equation (1). The mapping rule is determined in accordance with the equation (12) and equation (15) above.

The most significant 2 bits "01" in the symbol "010" specifies the second RE position in the first REPM word (RE1-RE4), and the least significant bit "0" in "010" specifies the +1 BPSK modulation.

The most significant 2 bits "10" in the next symbol "101" specifies the third RE position in the second REPM word (RE5-RE8), and the least significant bit "1" in "101" specifies the −1 BPSK modulation.

The most significant 2 bits "00" in the next symbol "001" specifies the first RE position in the third REPM word (RE9-RE12), and the least significant bit "1" in "001" specifies the −1 BPSK modulation. The most significant 2 bits "11" in the next symbol "110" specifies the fourth RE position in the fourth REPM word (RE13-RE16), and the least significant bit "0" in "110" specifies the +1 BPSK modulation. The most significant 2 bits "01" in the next symbol "011" specifies the second RE position in the fifth REPM word (RE17-RE20), and the least significant bit "1" in "011" specifies the −1 BPSK modulation. The most significant 2 bits "10" in the next symbol "100" specifies the third RE position in the sixth REPM word (RE21-RE24), and the least significant bit "0" in "100" specifies the +1 BPSK modulation.

Hierarchical Modulation with Unequal HM Word Length

Next, hierarchical modulation with an unfixed HM word length is explained. In this case, the HM word length depends on the index of the modulation symbol in DB. The modulation used in each DB, in general, may be any scheme, such as PPM, BPSK, QPSK, 16QAM and 64QAM.

Figure 8:
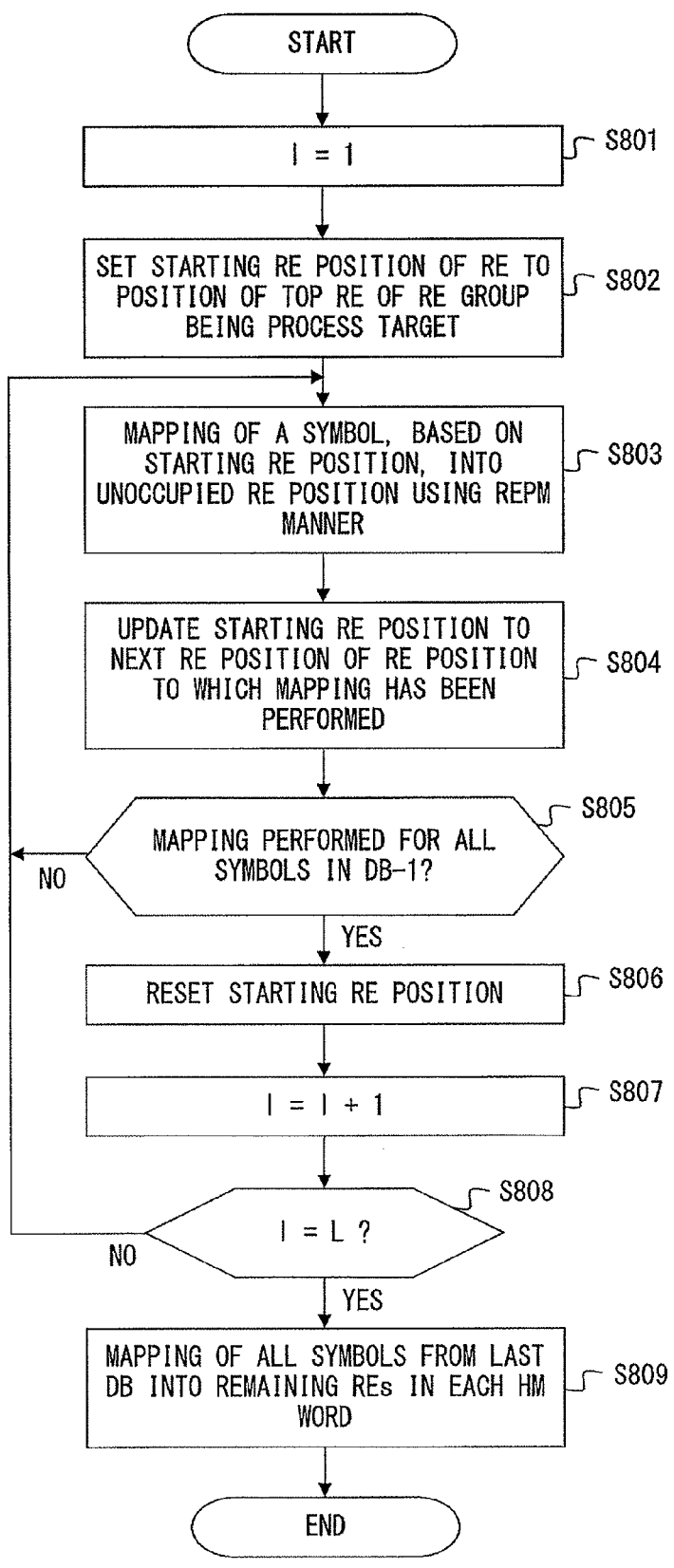
FIG. 8 is an operation flowchart illustrating a modulation process based on HM with unequal HM word length.

The procedure of the modulation process based on the HM having unequal HM word length is illustrated in the operation flowchart in FIG. 8.

First, the value of l is set as l=1 (step S801).

Next, the starting RE position of REPM is set as the position of the first RE among the N REs in the RE group that are the target of the process (step S802).

Next, one symbol from DB-l is mapped into the RE at the position corresponding to each symbol value in the RE group that is not occupied by the symbol from a previous DB, on the basis of the current REPM starting RE position, according to the REPM manner (step S803).

Next, the REPM starting RE position is updated to the RE position following the RE position to which the mapping was performed in step 2 (step S804).

Next, whether or not the mapping has been done for all the symbols from DB-l is judged (step S805).

When the mapping has not been completed for all the symbols from DB-1, with the result of the judgment in step S805 being NO. The process in step S803 and step S804 is repeated for the next symbol from DB-l.

When the mapping has been completed for all the symbols from DB-l with the result of the judgment in step S805 being YES, the REPM starting RE position is reset to the top side among the N REs in the RE group being the target of the process, and is set as the first RE position that is not occupied from the symbols from previous DBs, according to a search from performed from the top (step S806).

Next, the value of l is set as l=l+1 (step S807).

Next, whether or not the value of l has reached l=L (step S808) is judged.

When the value of l is within the range of 1 to L−1 with the result of the judgment being NO, the process from step S803 to step S807 is repeatedly performed for DB-1 to DB-L−1.

When the value of l reaches L with the result of the judgment in step S808 being YES, all the symbols from the last DB-L are mapped into the remaining REs (step S809).

At this time, if the number of bits in each DB can be adapted to the channel condition and mapping probability, the achievable capacity should be somewhat higher. In order to avoid complication, the capacity is derived in the following explanation only for the case where L=2.

For unfixed length of HM word with the number L of DBs=2, the capacity with word length m is given by the following equation.

$$C_m = \frac{1}{m} \cdot \left[ (m-1) \cdot \sum_{i=1}^{P} \alpha_{2,i} \delta_{2,i} + \sum_{i=1}^{P} \alpha_{1,i} [\delta_{1,i} + \log_2(M)] \right] \quad (16)$$

The equation is simplified as:

$$C_m = \frac{1}{m} \cdot [(m-1)\Phi_2 + \Phi_1 + \log_2(M)] \quad (17)$$

Since the unfixed word has equally likely length with the probability of 1/M, the average capacity can be described as:

$$C = \frac{1}{M} \sum_{m=1}^{M} C_m \quad (18)$$

By substituting $C_m$ into equation (17), the following equation (19) or equation (20) is obtained.

$$C = \Phi_2 + \frac{\log_2(M) + \Phi_1 - \Phi_2}{M} \cdot \sum_{m=1}^{M} \frac{1}{m} \quad (19)$$

$$C = \Phi_2 + \frac{\log_2(M) + \Phi_1 - \Phi_2}{M} \cdot \int_0^1 \frac{1-(1-t)^M}{t} dt \quad (20)$$

Hereinafter, the mapping method of the DB symbol into REPM word is explained.

The maximum REPM word length is assumed as M. The mapping rule is the same as described with FIG. 6 although the starting point for each REPM word is different depending on where the previous word is ending. Assuming that the previous word is ending at the n-th RE, the current starting point of the word needs be at the (n+1)-th RE.

Figure 9:
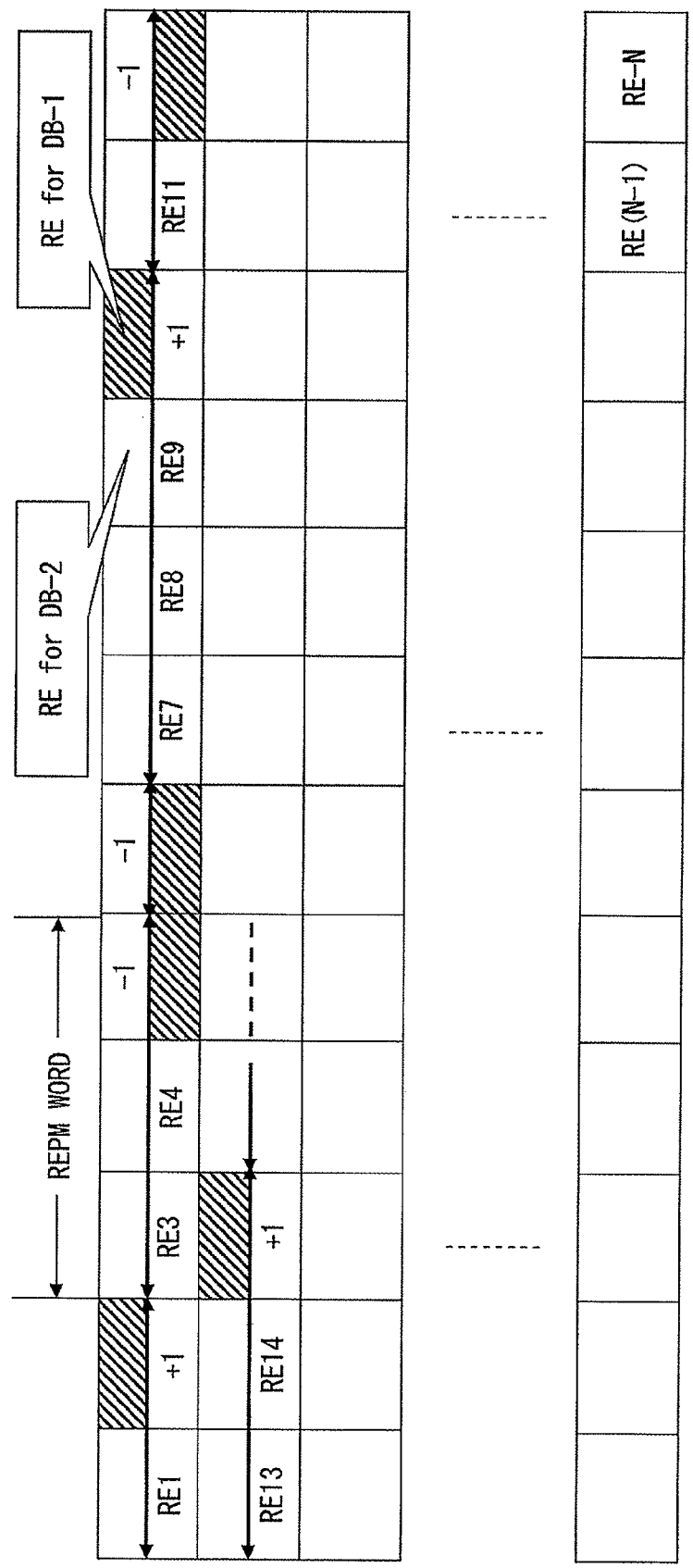
FIG. 9 illustrates an example of HM with unequal HM word length where the REPM word length M=4, the number of DBs L=2.

FIG. 9 illustrates an example of HM with unequal HM word length where the REPM word length M=4, the number L of DBs=2. Here, DB-1 symbols are "010" "101" "001" "110" "011" "100", and the BPSK modulation is assumed for DB-1. The indices of the modulation symbols are set as 3, 6, 2, 7, 4, and 5, respectively, in accordance with equation (1).

The most significant 2 bits '01' in the symbol "010" specifies RE2 at the second position counted from RE1 as the starting point (the first one), and the least significant bit '0' in "010" specifies the +1 BPSK modulation.

The most significant 2 bits '10' in the next symbol "101" specifies RE5 at the third position counted from RE3 at the next position of RE2 (the ending point of the above word) as the starting point, and the least significant bit '1' specifies the −1 BPSK modulation.

The most significant 2 bits '00' in the next symbol "001" specifies RE6 at the first position counted from RE6 at the next position of RE5 (the ending point of the above word) as the starting point, and the least significant bit '1' specifies the −1 BPSK modulation.

The most significant 2 bits '11' in the next symbol "110" specifies RE10 at the fourth position counted from RE7 at the next position of RE6 (the ending point of the above word) as the starting point, and the least significant bit '0' specifies the +1 BPSK modulation.

The most significant 2 bits '01' in the next symbol "011" specifies RE12 at the second position counted from RE11 at the next position of RE10 (the ending point of the above word) as the starting point, and the least significant bit '1' specifies the −1 BPSK modulation.

The most significant 2 bits '10' in the next symbol "100" specifies RE15 at the third position counted from RE13 at the next position of RE12 (the ending point of the above word) as the starting point, and the least significant bit '0' specifies the +1 BPSK modulation.

Hereinafter, embodiments of a transmitter and a receiver using the HM modulation scheme in the embodiment described above is explained.

<Transmitter Based on HM Scheme>

Figure 10:
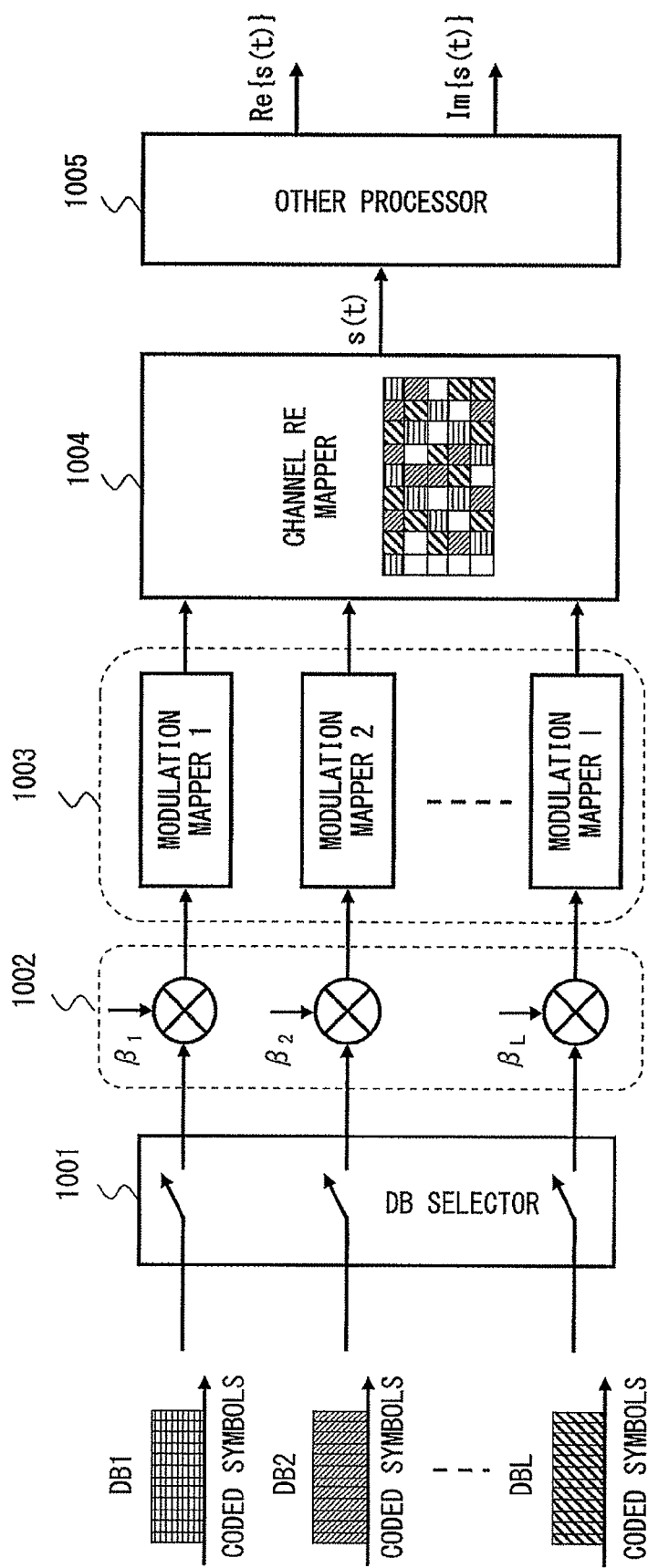
FIG. 10 is a configuration diagram of an example of a transmitter based on the HM scheme.

First, FIG. 10 is a configuration diagram of an embodiment of a transmitter based on the HM scheme.

The transmitter consists of a DB selector 1001, a gain multiplexer 1002, a modulation mapper 1003, a channel RE mapper 1004, and an other processer 1005.

The DB selector 1001 hieratically selects DB one by one for modulation. The DB selector 1001, in general, makes a selection from DB-1, DB-2 and up to DB-L in ascending index order. Once a DB is selected for modulation, the DB selector 1001 composes modulation symbols according to its available modulation order. This symbol composition is continued until it has been performed for all the symbols in the selected DB. When the process of the selected DB is completed, the same operation is performed for the next DB.

The gain multiplexer 1002 performs gain control by using a gain factor $\beta_l$ that is set for each DB$_l$, where l=1, 2, ..., L. The gain factor determines the transmission power ratio between L DBs. In general, the following constraints are maintained.

$$\beta_1 > \beta_2 \ldots > \beta_L \quad (21)$$

The modulation mapper 1003 following the gain multiplexer 1002 performs the following determination processes in the HM operation for each DB.

The determination of the position (RE group) to which modulation symbols can be allocated in each REPM word;

The RE to allocate the modulation symbol in the RE group of which position has been determined.

More specifically, the modulation mapper 1003 performs the hierarchical modulation process illustrated in the operation flowchart in FIG. 5 (the case of HM with equal HM word length) or in FIG. 8 (the case of HM with unequal HM word length). The process may be realized as an operation in which a processor constituting the transmitter performs a program corresponding to the operation flowchart in FIG. 5 or FIG. 8 stored in a memory, or as firmware or hardware that dedicatedly perform the process corresponding to the operation flowchart FIG. 4 or FIG. 8.

The channel RE mapper 1004 performs the mapping of the modulation symbols of each DB into appropriate REs based on the determination of the allocation for each DB done by the modulation mapper 1003, and outputs a complex-value transmission signal s(t) as a result.

The other processer 1005 performs a signal processing that depends on the transmission system for the complex-value transmission signal s(t). For example, with orthogonal frequency division multiple access (OFDMA) system adopted as the transmission system, an IFFT processing is performed, while with code division multiple access (CDMA) system adopted as the transmission system; a code spreading processing is performed.

Obviously, the modulated DBs may be transmitted to either single receiver or multiple receivers. However, the configuration and processing methods in the transmitter do not depend on the number of the recipients.

<Transmitter Based on HM Scheme>

Next, a receiver based on the HM scheme is explained.

Figure 11:
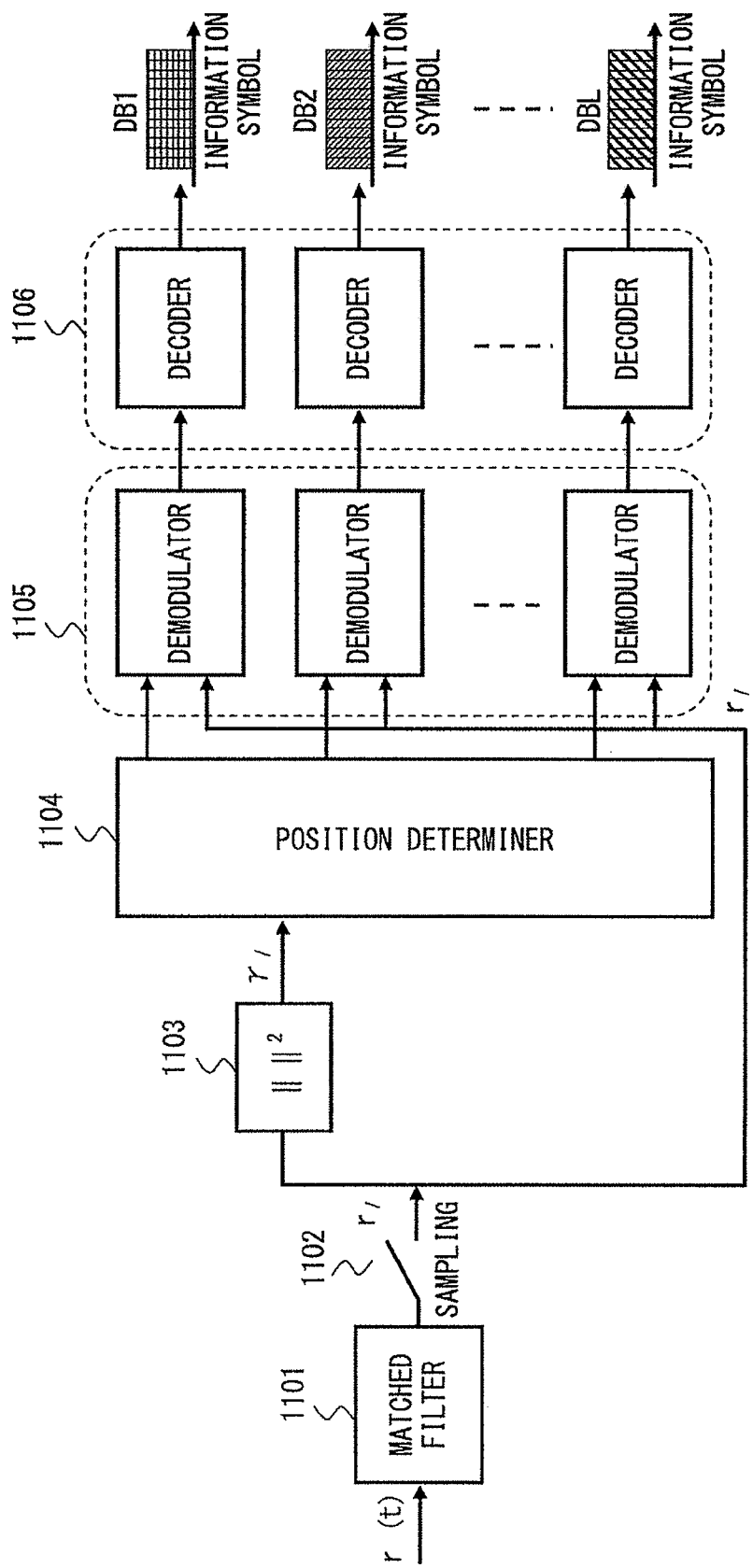
FIG. 11 is a configuration diagram of an embodiment of an optimum receiver for HM scheme based on the square-law operation.

FIG. 11 is a configuration diagram of an embodiment of an optimum receiver for HM scheme based on the square-law operation.

The receiver consists of a matched filter 1101, a sampler 1102, a square-law operator 1103, a position determiner 1104, a demodulator 1105, and a decoder 1106.

The matched filer 1101 extracts, from a received signal, a complex-value reception signal component that includes the communication signal component only, by a correlation calculation processing and so on in accordance with the communication system being used.

The sampler 1102 performs a sampling processing for an analog complex-value reception signal output from the matched filter 1101, to convert the analog complex-value signal into a complex-value discrete-time signal.

The complex-value discrete-time reception signal obtained by passing the received signal through the matched filter and the sample is expressed by the following equation, $$r_l = s_l + \eta_l \quad (22)$$

where $s_l$ is the modulation symbol and $\eta_l$ is the Gaussian noise with the variance of $N_0$.

The discrete-time reception signal obtained from equation (22) is input to the square-law operator 1103 that performs the square-law operation expressed with $\|\ \|^2$.

The output of square-law operator provides the energy of the received signal as the following equation, $$\gamma_l \|r_l\|^2 = \|S_{l,I} + \eta_{l,I}\|^2 + \|S_{l,Q} + \eta_{l,I}\|^2 \quad (23)$$

where $\eta_{l,I}$ and $\eta_{l,I}$ are the jointly Gaussian random variables both with the variance of $\sigma^2 = N_0/2$.

Since $S_{l,I}$ and $S_{l,Q}$ are the modulation symbol, they can be considered as constant numbers, and the resultant $\gamma_l$ becomes a non-central chi-square distributed, and its probability density function is given by the following equation, $$p(\gamma_l | \zeta_l) = \frac{1}{2\sigma^2} \exp\left(-\frac{\gamma_l + \zeta_l}{2\sigma^2}\right) \cdot I_0\left(-\frac{\sqrt{\zeta_l \gamma_l}}{\sigma^2}\right), \quad \gamma_l \geq 0 \quad (24)$$

where $I_0(\bullet)$ is the zero-th order modified Bessel function of the first kind, and $\varsigma_l = S_{l,I^2} + S_{l,Q^2}$. For M-ary PSK, $\varsigma_l$ is equal to the transmission energy of $\epsilon_l$.

According to the property of the modified Bessel function, when x in $I_n(x)$ is large enough (e.g., x>>n), equation (24) can be simplified as follows.

$$p(\gamma_l | \zeta_l) = \frac{1}{2\sigma\sqrt{2\pi\sqrt{\gamma_l\zeta_l}}} \exp\left[-\frac{(\sqrt{\gamma_l} - \sqrt{\zeta_l})^2}{2\sigma^2}\right], \quad \gamma_l \geq 0 \quad (25)$$

The position determiner 1104 detects the RE positions that can be occupied by each DB, from the reception energy signal $\gamma_l$ expressed by equation (23) given from the square-law operator 1103 as an input. The design of the position determiner 1104 depends on the realization method of HM, such as the HM scheme with equal HM word length or the HM scheme with unequal HM word length.

Demodulator collects the received signal based on the RE positions that can be occupied by each DB determined by position determiner 1104 from the discrete-time received signals expressed by equation (22) given from the sampler 1102, and then performs coherent demodulation process for individual DB. The resultant soft bits are input into the decoder 1106 in the next stage.

The decoder 1106 performs a process for calculating what the transmitted information bits is, by using, for example, a Turbo decoder.

Figure 12:
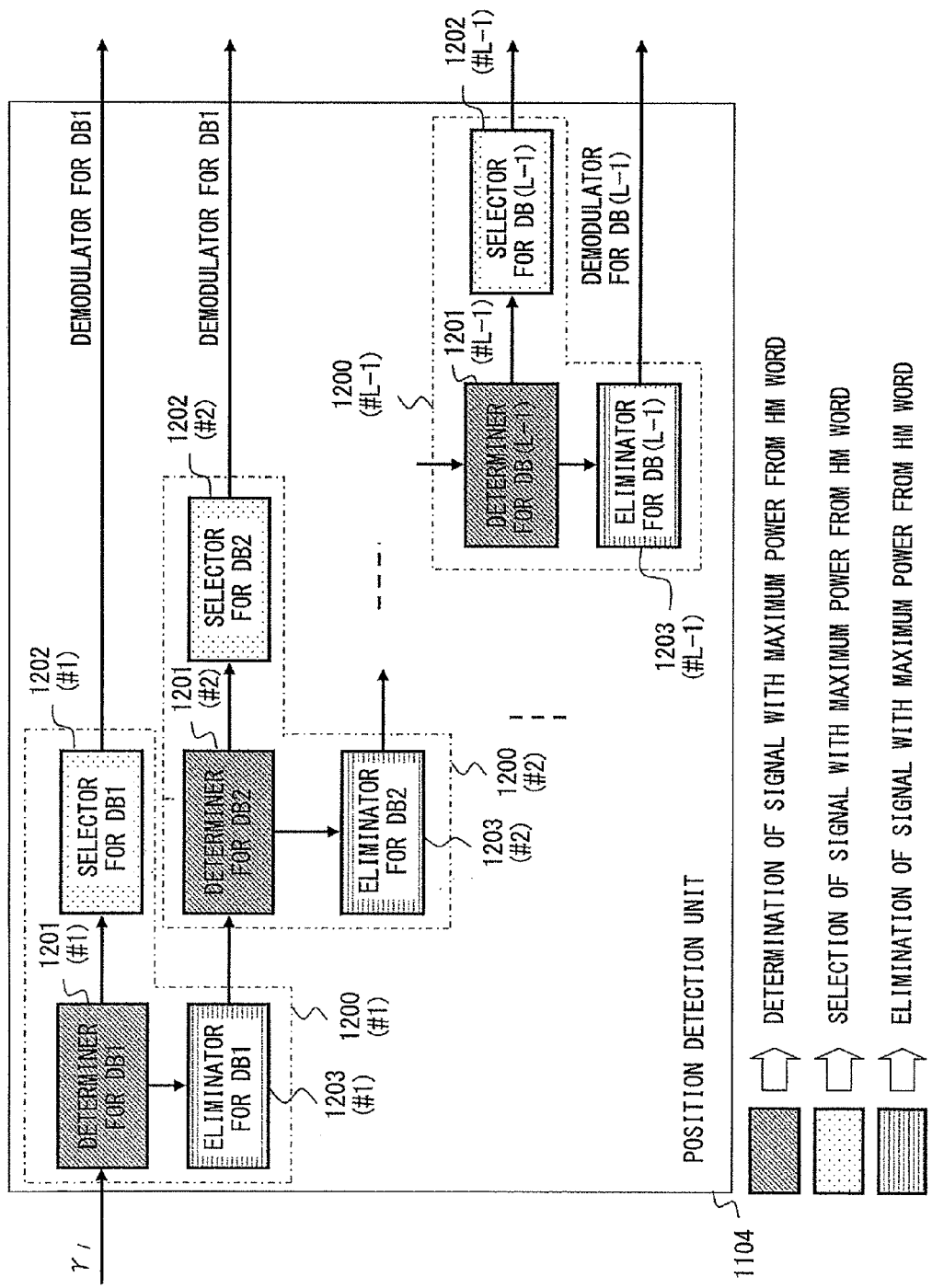
FIG. 12 is a diagram illustrating a configuration example of a position determiner 1104 with equal HM word.

FIG. 12 is a diagram illustrating a configuration example of the position determiner 1104 in FIG. 11 with equal HM word length.

The position determiner 1104 operates so as to select, from input reception energy signals $\gamma_l$, the one with the highest value.

The position determiner 1104 has hierarchical modules 1200 #1 through #L−1 each consisting of three processor of a determiner 1201, a selector 1202, and a remover 1203. The hierarchical modules are configured hierarchically corresponding to the respective DBs #1 through #L−1.

In a #i (i=1, 2, ... L−1) hierarchical module 1200, according to the current input energy signal $\gamma_l$ input from the square-law operator 1103 in FIG. 11 (when i=1) or from the remover 1203 in the previous stage (when i>1), the determiner 1201 detects the energy signal having the highest reception energy from the reception energy signals.

The selector 1202 sends a notification of the information of the RE position corresponding to the reception energy signal detected by the determinater 1201 to the demodulator 1105 (see FIG. 11) of the $DB_i$ corresponding to the hierarchical module 1200 (#i) to which the selector 1202 belongs to.

The demodulator 1105 of $DB_i$ performs a demodulation process for $DB_i$ to the reception signal at the RE position according to the notification, the signal being selected from discrete-time signals $r_l$ (l=1, 2, ..., H) in the current HM word input from the sampler 1102.

For the RE position determination process in the next hierarchical module 1200 (#i+1), the remover 1203 removes, from the reception energy signal in the current HM word, the reception energy signal component at the RE position detected in the hierarchical module 1200 (#i) to which the remover 1203 belongs to, and outputs the resultant reception energy signal to the determinater 1201 in the next hierarchical module 1200 (#i+1). After that, the same operation is hierarchically performed for #1 through #L−1 for each hierarchical module 1200 in ascending index order of the DBs.

The probability of correctly extracting the DE position for the symbol in the l-th DB can be expressed as follows.

$$P_l^{(C)} = \int_o^\infty p(\gamma_l) \cdot \prod_{k=1}^{l-1} P(\gamma_l < \gamma_k | \gamma_l) \cdot \prod_{k=l+1}^{H} P(\gamma_l < \gamma_k | \gamma_l) d\gamma_l \quad (26)$$

Figure 13:
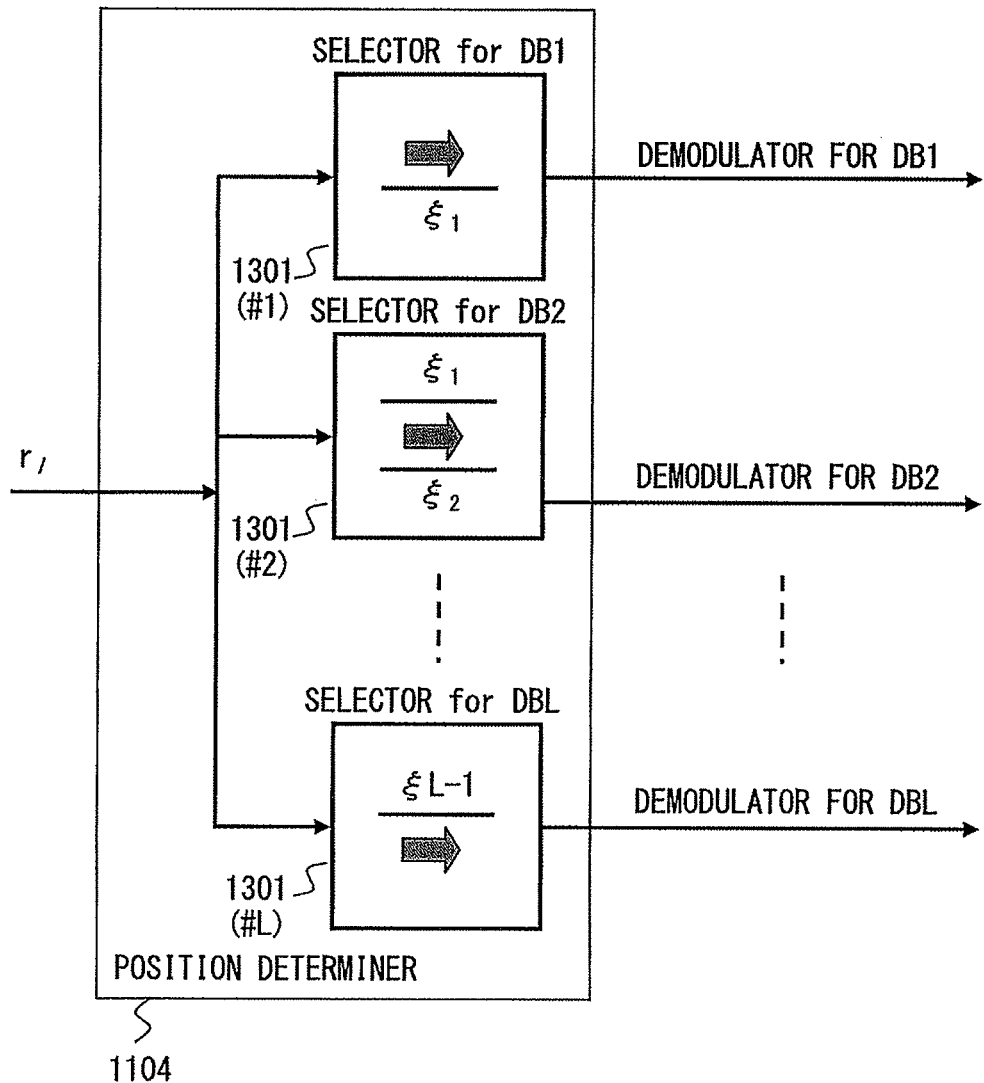
FIG. 13 is a diagram illustrating a configuration example of a position determiner 1104 with unequal HM word.

FIG. 13 is a diagram illustrating a configuration example of the position determiner 1104 in FIG. 11 with unequal HM word length.

The operation is dependent strongly upon the predetermined threshold $\varsigma_l$ (l=1, 2, ..., L−1) for each $DB_l$. Unlike the embodiment in FIG. 12, the position determiner 1104 illustrated in FIG. 13 simply consists of L selectors 1301 (#1), 1301 (#2), 1301 ... (#L) that has a predetermined threshold and correspond to DB-1, DB-2, ..., DB-L.

The selector 1301 #l (l=1, 2, ..., L) determines whether or not the current reception timing is the reception timing for $DB_l$, by judging, for each input timing of the reception energy signal $\gamma_l$ input from the square-law operator 1103 in FIG. 11, to which range the reception energy signal value $\gamma_l$ falls in, the range distinguished by L−1 threshold values $\varsigma_i$ (l=1, 2, ..., L). When it determines that the current reception timing is the reception timing for $DB_l$, the selector 1301 #l sends a notification to tell that to the demodulator 1105 corresponding to $DB_l$.

The demodulator 1105 corresponding to $DB_l$ performs a demodulation process for $DB_l$ at the timing when it received the notification, the demodulation being done to the discrete-time reception signal input from the sampler 1102.

Since each selector 1301 #l through #L can simultaneously perform the detection of the RE for $DB_l$ with independent threshold values $\varsigma_l$ respectively, the processing delay in the position determiner 1104 is small.

Figure 14:
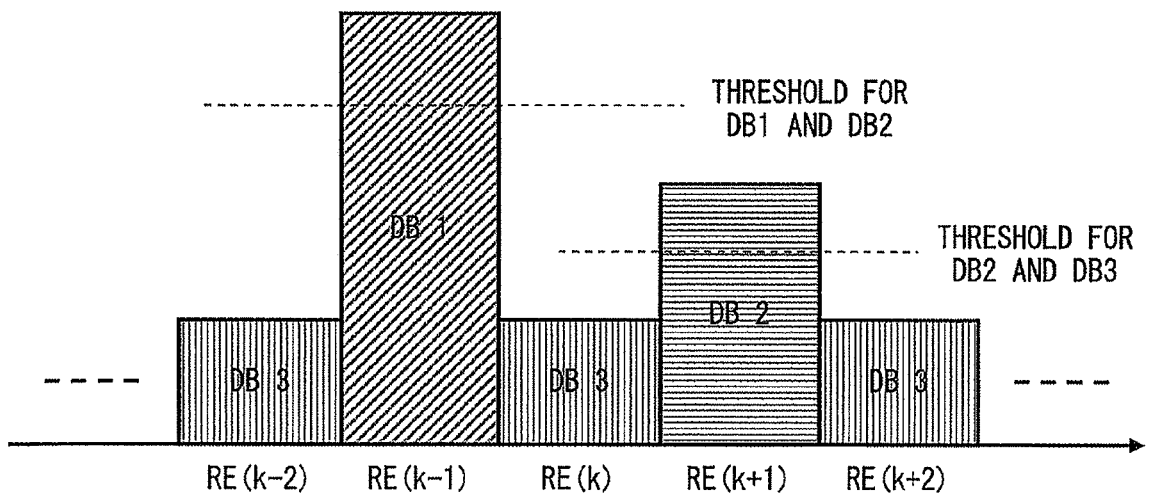
FIG. 14 is a diagram describing an example of position detection performed by a position determiner 1104 having the configuration in FIG. 13.

FIG. 14 is a diagram illustrating the position detection in the embodiment. In this example, energy signals in DB-1, DB-2, and DB-3 can be easily separated by the preconfigured thresholds.

The preconfigured threshold for the position detection is a virtual concept, and it should be implemented by a decision rule. Once the transmission power for each DE is determined, the optimum RE position decision rule can be expressed as the following equation, $$\sum_{k=l+1}^{L} \frac{p(s_k)}{p(s_l)} \cdot \frac{I_o\left(\frac{\sqrt{\zeta_k \gamma}}{\sigma^2}\right)}{I_o\left(\frac{\sqrt{\zeta_l \gamma}}{\sigma^2}\right)} \cdot \exp\left(\frac{\zeta_k - \zeta_l}{2\sigma^2}\right) \underset{Otherwise}{\overset{s_l}{\underset{>}{\leq}}} 1 \quad (27)$$

where l=1, 2, ..., L−1.

The probability of correctly detecting the DB position for the symbol in the l-th can be expressed as $$P_l^{(C)}(s_l) = 1 - \int_{\zeta_l}^\infty \sum_{k=l+1}^{L} p(s_k) \cdot p(\gamma|\zeta_k) d\gamma + \int_{\zeta_{l-1}}^\infty p(s_l) \cdot p(\gamma|\zeta_l) d\gamma \quad (28)$$

where $\varsigma_l$ is the preconfigured thresholds for the energy signal in the l-th DB.

<Mapping Method for Hierarchical Modulation>

A specific signal positioning in the embodiment of the hierarchical modulation is explained below.

A typical modulation processes such as M-ary phase-shift keying (MPSK) and M-ary quadrature amplitude modulation (MQAM) produce a constellation of I-Q points which can be used as a reasonably reliable transmission signal.

Figure 15A:
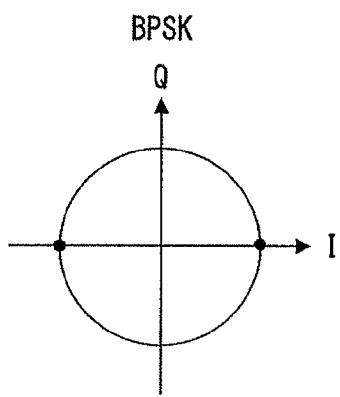
FIG. 15A is a diagram describing a signal constellation on I-Q plane of BPSK.
Figure 15B:
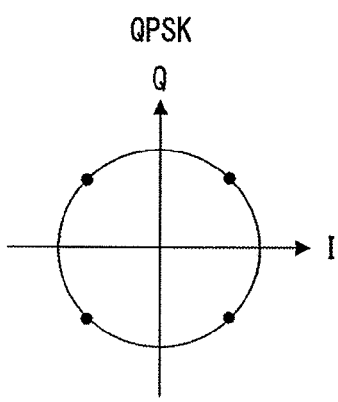
FIG. 15B is a diagram describing a signal constellation on I-Q plane of QPSK.
Figure 15C:
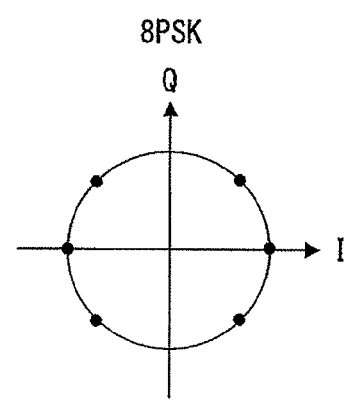
FIG. 15C is a diagram describing a signal constellation on I-Q plane of 8PSK.

FIG. 15A, FIG. 15B, FIG. 15C illustrate the signal constellations on the I-Q plane of BPSK, QPSK, 8PSK, respectively. FIG. 16A and FIG. 16B illustrate the signal constellations of 16QAM and 64QAM.

Figure 17:
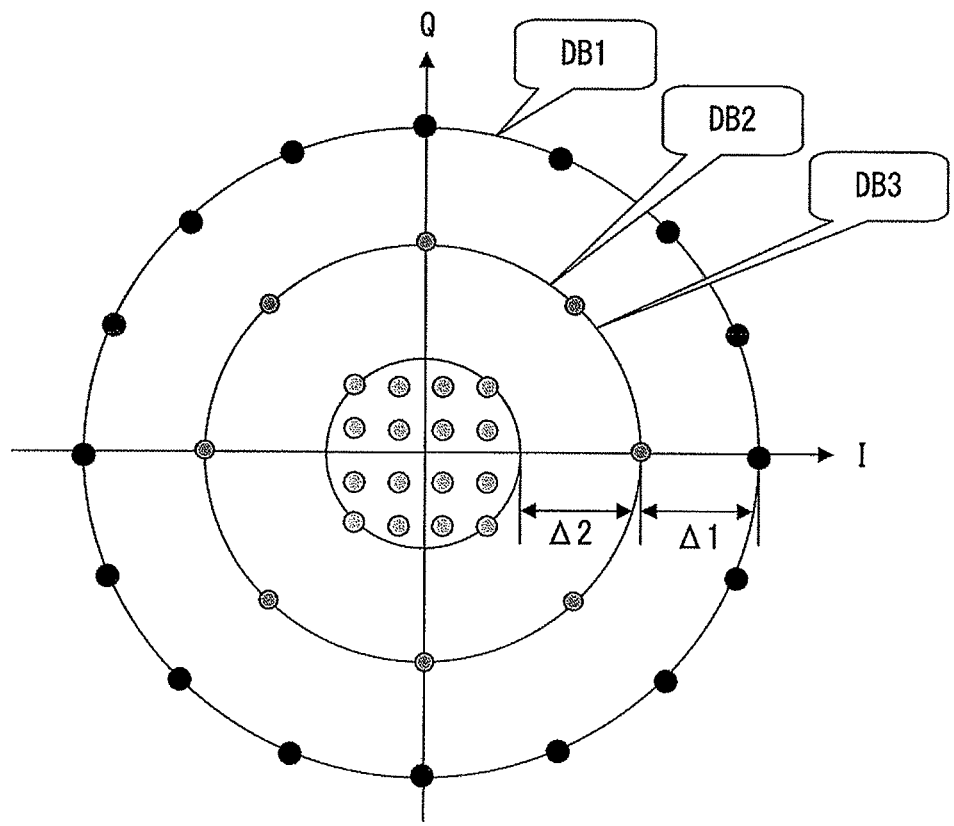
FIG. 17 is a diagram illustrating an example of a signal constellation of three DBs.

Now, it is simply assumed that DB-l with l=1, 2, ..., L−1 employs the MPSK, while the remaining DB-L employs MQAM (M being a certain natural number. The power offset between neighboring DBs is constant Δ. With this assumption, when L=3, the constellations of the three DBs are as illustrated in FIG. 17, where DB-1, DB-2, and DB-3 utilize 16PSK, 8PSK, and 16QAM, respectively.

<Power Allocation Between DBs>

Hereinafter, the power allocation between DBs for realizing the power control in the gain multiplexer 1002 in the transmitter illustrated in FIG. 10 is explained.

Transmission Energy for HM

To decide the transmission power distributed in different DBs, the offset between neighboring DBs is assumed to be constant Δ. Since the transmission bandwidth for all DBs is the same, it would be simple to use energy rather than power. Several parameters are defined as follows:

$\varepsilon_l$ is the transmission energy per modulation symbol for the l-th DB, where l=1, 2, ..., L−1.

$\varepsilon_L$ is the average transmission energy per modulation symbol for the L-th DB.

$\varepsilon_{L,max}$ is the maximum transmission energy per modulation symbol for the L-th DB. the relationship between $\varepsilon_{L,max}$ and the average transmission energy depends on the modulation order k, yielding an equation $$\varepsilon_{L,max} = \mu_k \overline{\varepsilon}_L \quad (29)$$

where $\mu_k$ is the coefficient of the energy for the modulation order k. An example of $\mu_k$ for QPSK, 16QAM and 64QAM is listed in Table 5.

TABLE 5

| Modulation | Coefficient $\mu_k$ |
|---|---|
| QPSK | 1 |
| 16QAM | 1.8 |
| 64QAM | 2.33333 |

$\Delta_{\varepsilon,l}$ is the offset energy between neighboring DB-l and DB-(l+1), which is a constant.

$\varepsilon$ is the average transmission energy per modulation symbol over the HM word, resulting in the total transmission energy per HM word $\varepsilon_{total}=H\varepsilon$.

According to the above definitions, with all linear scale calculation, the relationship in the following equation is obtained.

$$\varepsilon_l = \varepsilon_{L,max} \prod_{i=1}^{L-l} \Delta_{\varepsilon,L-i} \quad (30)$$

$$l = 1, 2, \ldots, L, i = 1, 2, \ldots, L-1$$

By summing the transmission energy over the HM word with the length of H, the total energy per HM word can be expressed as the following equation.

$$\varepsilon_{total} = \sum_{l=1}^{L-1}\left[\varepsilon_{L,max}\prod_{i=1}^{L-l}\Delta_{\varepsilon,L-i}\right] + \overline{\varepsilon_L}(H-L+1) \quad (31)$$

$$= \varepsilon_{L,max}\left(\frac{H-L+1}{\mu_k} + \sum_{l=1}^{L-1}\sum_{i=1}^{L-l}\Delta_{\varepsilon,L-i}\right)$$

For special case of setting equal energy offset, meaning $\Delta_{\varepsilon,i}=\Delta_\varepsilon$, equation (31) is simplified as the following equation.

$$\varepsilon_{total} = \varepsilon_{L,max}\left(\frac{H-L+1}{\mu_k} + \frac{\Delta_\varepsilon - \Delta_\varepsilon^L}{1-\Delta_\varepsilon}\right) \quad (32)$$

Equation (31) and equation (32) mean that once the average energy $\varepsilon$ per modulation symbol over the HM word or the average SNR (signal-to-noise ratio) $\chi$ per modulation symbol over the HM word is given, the transmission symbol energy $\varepsilon_l$ for each DB can be determined.

A gain factor $\beta_l$ in the gain multiplexer 1002 is determined on the basis of the energy value $\varepsilon_l$ that is determined as described above.

Average Transmission Energy for Each HM Word

To determine the average transmission energy for each HM word, some assumptions are made for general modulation scheme as follows:

The received SNR for each RE, $\chi$, is a constant.
The received energy for each RE is $\varepsilon_l$, where l=1, 2, ..., L.
The received noise PSD (power spectral density) is different, denoted $N_{0,l}$, where l=1, 2, ..., L.

In accordance with the above, the following equation is obtained.

$$\chi = \frac{\varepsilon_l}{N_{0,l}} \quad (33)$$

where l=1, 2, ..., L.

The total transmission energy is given as the following equation.

$$\varepsilon_{total} = H\varepsilon = (H-L+1)\cdot\varepsilon_L + \sum_{l=1}^{L-1}\varepsilon_l \quad (34)$$

Therefore, the average transmission energy can be written as the following equation.

$$\varepsilon = \frac{\chi}{H}\left[(H-L+1)\cdot N_{o,L} + \sum_{l=1}^{L-1}N_{o,l}\right] \quad (35)$$

<Applications of Hierarchical Modulation>

The hierarchical modulation scheme according to the embodiment described above has the following features.

Significantly improve the peak data rate as opposed to the classical modulation.

Significantly achieve the MBMS (Multimedia Broadcast Multicast Service) gain by multiplexing MBMS traffic and unicast traffic.

The hierarchical modulation scheme according to the embodiment has different characteristics in time domain and frequency domain. It is preferable for the modulation scheme to hierarchically modulate the symbol in frequency domain rather than in time domain due to the PAPR (peak to average power ratio) issue:

In time domain, the power boosting could cause maximum PA design problem.

In frequency domain, the power boosting is naturally allowed to improve the system performance. For example, power boosting in OFDMA system could easily be performed in reference channel as well as control channel.

Analysis for Peak Data Rate

In the embodiment, since multiple DBs can be transmitted to a single user using one transport block, the peak data rate can be significantly high as compared to the classical modulation scheme such as QAM.

The peak rate of the modulation scheme according to the embodiment, depends on the modulation scheme as well as its probability in each DB, and can be expressed by equation (8) mentioned above. Meanwhile, the peak rate for classical modulation is given by the following equation, $$C_{conv} = \sum_{i=1}^{P} \alpha_i \delta_i \qquad (36)$$

where $\alpha_i$ and $\delta_i$ represent the probability of modulation used in DB and the modulation order for the i-th modulation order, respectively. The numerical advantage of the modulation scheme according to the embodiment over classical modulation will be described later.

Analysis for MBMS

MBMS (Multimedia Broadcast Multicast Service) has its own behaviours and characteristics as follows:

In MBMS networks, multiple node-Bs (or a single node-B) multicast the same data signal to multiple user equipments (UEs). Therefore, the MBMS system is subject to frequency diversity due to delayed signals received from multiple node-Bs.

It is not possible to employ a control channel from the UE as well as HARQ process from node B. Thus, the link adaptation becomes not feasible. In order to guarantee the MBMS coverage, each node B must secure a large SINR (signal to interference plus noise ratio) margin.

As a consequence, MBMS service, in general, requires a much better performance in terms of block error rate rather than unicast service. Currently, for example in LTE (Long Term Evolution) technology that has been standardized by the 3GPP (3rd Generation Partnership Project) that is a standardizing organization of W-CDMA (Widepand Code Division Multiple Access) being one of the third generation (3G) mobile-phone wireless access systems, MBMS is operated using individual frequency band or time division when both MBMS and unicast service exist at the same time. This causes a huge frequency efficiency loss due to a large MBMS SINR margin.

The HM scheme favors according to the embodiment is preferable for such an environment when MBMS and unicast services coexist. They can easily be operated at the same frequency band. In other words, in the modulation scheme according to the embodiment, DB1 may be assigned for MBMS service and DB2 can be assigned for unicast service. This makes it very easy to correctly detect MBMS DB position first, and then unicast DB symbols, because the received SINR for MBMS UE is much higher than that for unicast UEs.

<Numerical Analysis>

Figure 18:
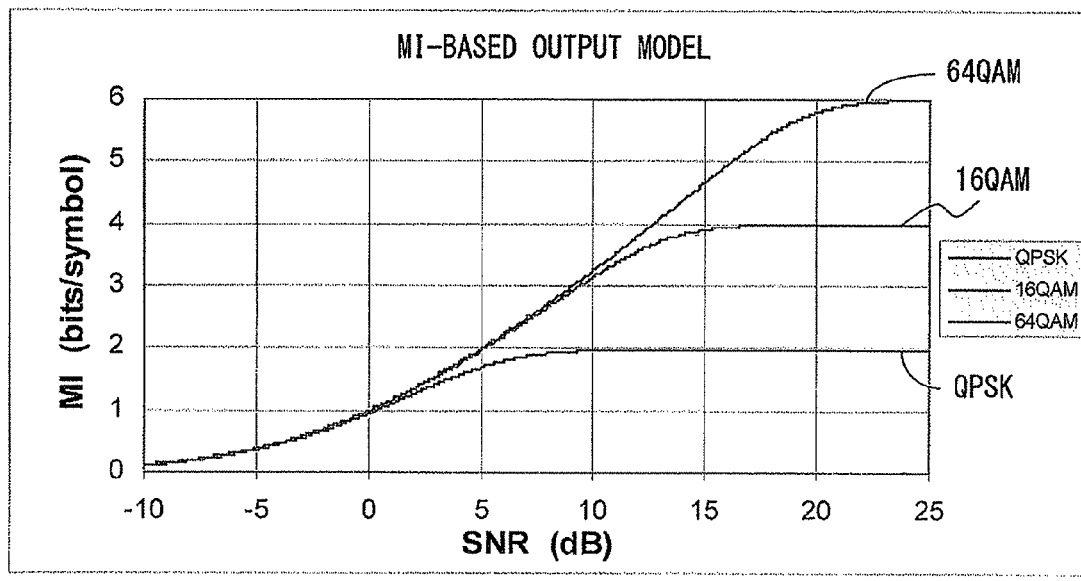
FIG. 18 is a diagram illustrating the characteristics of mutual information with respect to SNR.
Figure 19:
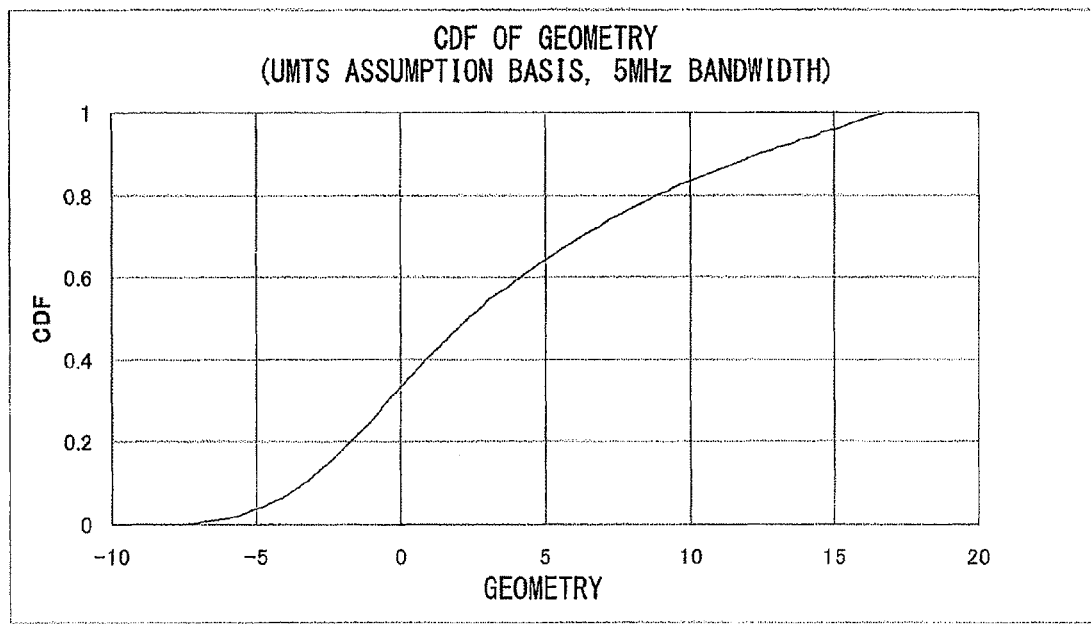
FIG. 19 is a diagram illustrating the characteristics of CDF of geometry with respect to HSDPA.

In the following explanation, the SINR distribution is determined first, and then the probability of the application of MCS (Modulation Coding Scheme) for QPSK, 16QAM, and 64QAM is discussed. To accomplish it, the mutual information (MI) as illustrated in FIG. 18 is derived first, where MI is a function of SINR with respect to QPSK, 16QAM, and 64QAM. As a rule of thumb, the required SINRs for QPSK, 16QAM, and 64QAM are listed in the middle column of Table 6. In order to further figure out the probability of each modulation as listed in Table 6, it is assumed that the numerical assumption is based on HSDPA (High Speed Downlink Packet Access) that is a standard that involves higher-speed data communication according to the W-CDMA system. The assumption provides the CDF (Cumulative Distribution Function) of long-term SINR (or Geometry as other terminology) as illustrated in FIG. 19.

TABLE 6

| Modulation Types | Required SINR (dB) | Probability |
| --- | --- | --- |
| QPSK | >7 | 0.70 |
| 16QAM | >15 | 0.25 |
| 64QAM | >21 | 0.05 |

According to FIG. 19, the probability of QPSK, 16QAM, and 64QAM listed on the right column of Table 6 are observed, which are used for the numerical calculation described below.

To numerically calculate the system capacity for various specified values of REPM word lengths, the number of DB is assumed first as L=2 for comparison scenario, in which DB1 belongs to MBMS service, while DB2 belongs to unicast service. The related assumptions are listed in Table 7.

TABLE 7

| Parameters | Values |
| --- | --- |
| Number of DBs, L | 2 |
| Modulation Type for DB1 | PPM, BPSK, QPSK, 16QAM, 64QAM |
| Modulation Type for DB2 | QPSK, 16QAM, 64QAM |
| MCS Adaptation for DB1 | Not fixed modulation for all the time |
| MCS Adaptation for DB2 | Yes, with Probability listed in Table 6 |
| HM Type | Fixed word/Unfixed word |

Figure 20:
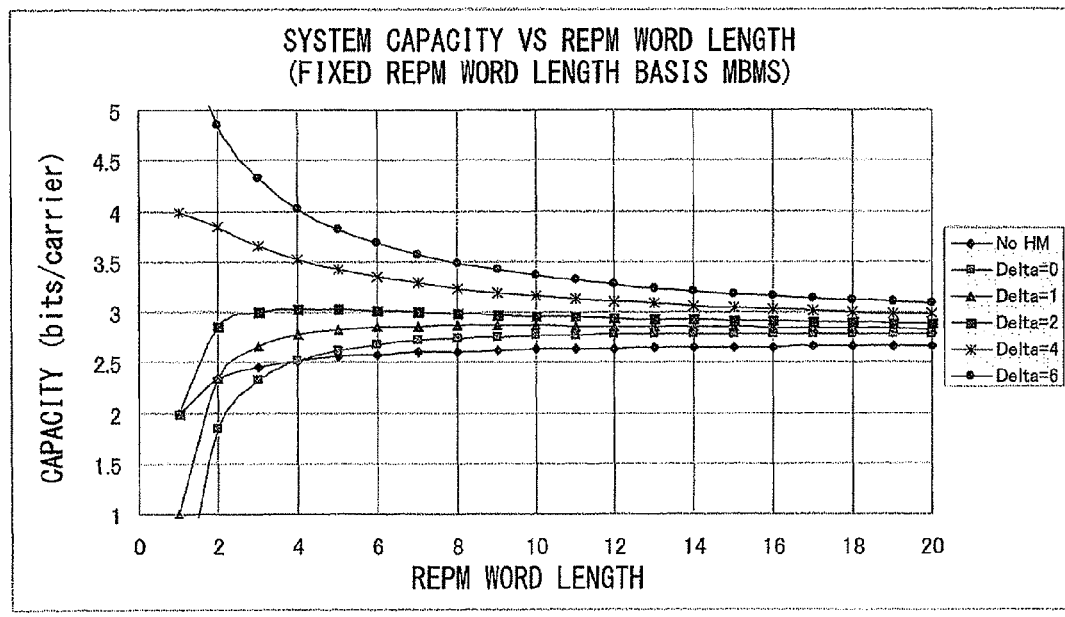
FIG. 20 is a diagram illustrating the characteristics of overall system capacity with respect to REPM word length for MBMS with fixed REPM.

FIG. 20 illustrates the overall system capacity as a function of REPM word length for various specified values of modulation orders $\delta_{l,i}$, when the word length is fixed. From FIG. 20, it can be seen that the optimum REPM word length is 4 when QPSK modulation scheme is employed for DB1. In general, QPSK is the most reasonable modulation for MBMS, where the gain achieved by REPM scheme is more than 20% compared to the classical modulation scheme.

The gain of the modulation scheme according to the embodiment over the classical modulation scheme is defined as the following equation, $$G_i = \frac{\delta_{1,i}^{(HM)} + \log(M)}{\delta_{2,i}^{(Conv)}} \qquad (37)$$

where i represents the modulation index.

For the sake of simplicity, $\delta_{1i}^{(HM)} = \delta_{2i}^{(Conv)}$ is assumed in the following numerical analysis.

Figure 21:
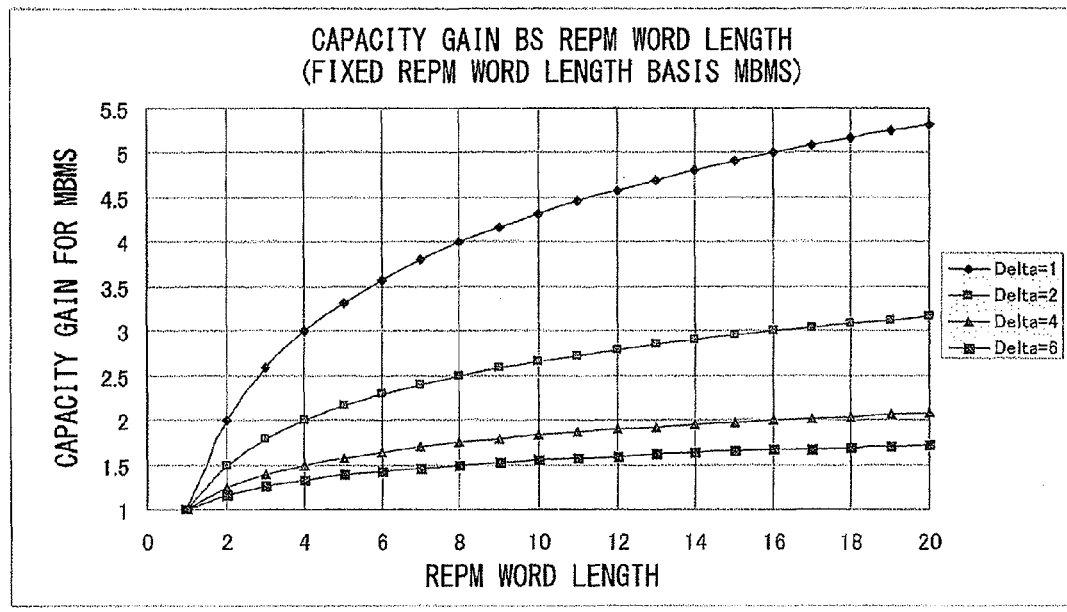
FIG. 21 is a diagram illustrating the characteristics of capacity gain with respect to REPM word length for MBMS with fixed REPM.

FIG. 21 illustrates the capacity gain for MBMS only as a function of REPM word length for various specified values of modulation orders $\delta_{li}$, when the maximum word length is fixed. It can be seen that the larger the REPM word length, the higher gain can be achieved.

From the results obtained from FIG. 20 and FIG. 21, it can be concluded that the REPM word length should not be shorter than 4.

FIG. 22 illustrates the overall system capacity as a function of REPM word length for various specified values of modulation orders $\delta_{li}$, when the maximum word length is fixed (but unfixed REPM word length). From FIG. 22, it can be seen that the optimum REPM word length is 8 when QPSK modulation scheme is employed for DB1. This value is doubled as compared to the scenario of fixed length REPM word, where the gain achieved is more than 25% compared to the classical modulation scheme.

Figure 23:
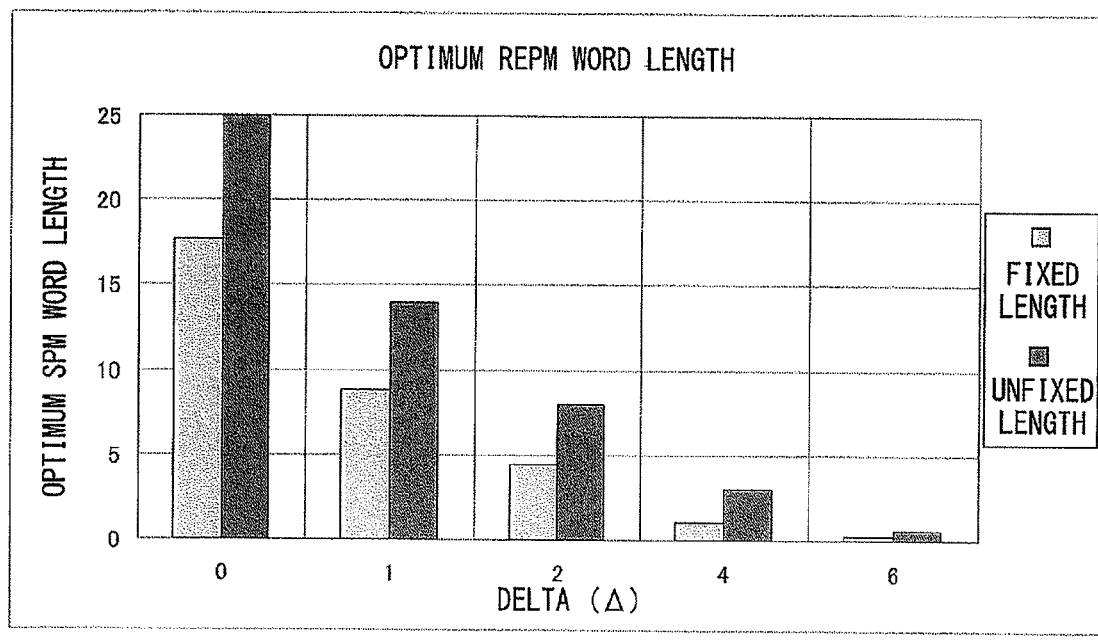
FIG. 23 is a diagram illustrating the characteristics of an optimum REPM word length for MBMS based on fixed or unfixed REPM.

FIG. 23 illustrates the optimum value using either fixed or unfixed length REPM word. It can be seen that the optimum value for the fixed length word is always smaller than that for the unfixed length word.

Obviously, although a larger word length results in a higher capacity gain, the word length for HM modulation according to the embodiment should be determined based on the payload size as well as assigned MCS, in practice.

The embodiment described above, evolutionally breaks through the classical modulation concept and accelerates innovation of modulation techniques. This hierarchical modulation scheme makes it possible to guarantee the data transmission rate and to significantly improve the overall system capacity. Furthermore, from the application point of view, the embodiment makes it possible to improve the peak data rate, when MBMS (Multimedia Broadcast Multicast Service) and unicast services coexist in the same frequency band.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A modulating method used when mapping modulation symbols obtained by modulating transmission information into resource elements that are physical channel units, generating transmission signals from a resource element group of a predetermined number of resource elements for which the mapping has been performed, and generating and transmitting transmission output signals by performing, for the transmission signals, signal processing based on predetermined communication schemes, said modulation method comprising:

extracting, by a transmitter, transmission information from each of a plurality of data blocks that respectively transmit transmission information from independent information sources;

generating, by the transmitter, a modulation symbol by performing modulation for the extracted transmission information using a predetermined modulation scheme for each data block;

controlling, by the transmitter, transmission powers of the modulation symbols generated for the respective data blocks at transmission power ratios decided between the respective data blocks;

selecting, by the transmitter, each of the plurality of data blocks one by one in a descending order of the transmission power ratio;

performing, based on a value of the modulation symbol of a currently selected data block, decision of an allocation of the modulation symbol of the currently selected data block within one or more unused resource elements to which no modulation symbol of a data block that has been previously selected in the descending order is allocated; and mapping, by the transmitter the modulation symbols that have been obtained for the plurality of data blocks into the resource element group, based on the decided allocation.

2. The method according to claim 1, wherein said resource element group is divided into a plurality of hierarchical modulation words that are units of hierarchical modulation and comprises a predetermined number of the resource elements; and said decision of an allocation of the modulation symbol comprises:

setting a data block number to one when selecting each of the plurality of data blocks one by one in a descending order of the transmission power ratio;

next, for each of the hierarchical modulation words, assigning a resource element number in sequence starting from one from a top to a last of each of the hierarchical modulation words in sequence;

next, performing a symbol allocation decision process for deciding, with respect to each of modulation symbols that have been obtained for a data block corresponding to a current data block number, each position in resource elements for which the resource element number has been assigned in each of the hierarchical modulation words, the position corresponding to a value of each of the modulation symbols, as an allocation of each of the modulation symbols;

next, removing resource elements for which allocation has been decided to assign the resource element number again in sequence starting from one to the resource elements remaining in each of the hierarchical modulation words;

next, incrementing the data block number by one;

next, determining whether or not the data block number has reached a number of the plurality of data blocks and when it is determined that the data block number has not reached the number of the plurality of data blocks, returning control to a performance of the symbol allocation decision process, and when it is determined that the data block number has reached the maximum number of the data block, performing a next process; and next, with respect to all modulation symbols that have been obtained for a last of the data blocks, deciding all of resource elements for which the resource element number has been assigned within each of the hierarchical modulation words as an allocation of the modulation symbols.

3. The method according to claim 1, said decision of an allocation of the modulation symbol comprising:

setting a data block number to one when selecting each of the plurality of data blocks one by one in a descending order of the transmission power ratio;

next, setting a starting resource element position of hierarchical modulation to a position of a top resource element of the resource element group;

next, performing a symbol allocation decision process for deciding, with respect to modulation symbols that have been obtained for a data block corresponding to a current data block number, a position corresponding to a value of each of the modulation symbols in resource elements for which allocation has not been decided yet, with a current starting resource element position as a basis, as an allocation of each of the modulation symbols;

next, updating the current starting resource element position to a next resource element position of a position to which an allocation has been decided by the symbol allocation decision process;

next, determining whether or not mapping of the modulation symbols that have been obtained for a data block corresponding to the current data block number has been done to a last of the resource element group, and when it is determined that the mapping has not been completed to the last, returning control to a performance of the symbol allocation decision process, and when it is determined that the mapping has been completed to the last, performing a next process;

next, setting the starting resource element position to a first resource element position for which an allocation has not been decided by performing a search from a top of the resource element group;

next, incrementing the data block number by one;

next, determining whether or not the data block number has reached a number of the plurality of data blocks and when it is determined that the data block number has not reached the number of the plurality of data blocks, returning control to a performance of the symbol allocation decision process, and when it is determined that the data block number has reached the maximum number of the data block, performing a next process; and next, with respect to all modulation symbols that have been obtained for a last of the data blocks, deciding all of resource elements for which the resource element number has been assigned within each of hierarchical modulation words as an allocation of the modulation symbols.

4. The method according to claim 1, wherein
the data blocks except for a last data block in the plurality of data blocks transmit transmission information in a multimedia broadcast multicast service; and
the last data block transmits transmission information in a unicast service.

5. A transmitter mapping modulation symbols obtained by modulating transmission information into resource elements that are physical channel units, generating transmission signals from a resource element group of a predetermined number of resource elements for which the mapping has been performed, and generating and transmitting transmission output signals by performing, for the transmission signals, signal processing based on predetermined communication schemes, said transmitter comprising:

a data block selector configured to extract transmission information from each of a plurality of data blocks that respectively transmit transmission information from independent information sources, and to generate a modulation symbol by performing modulation for the extracted transmission information using a predetermined modulation scheme for each data block;

a gain multiplexer configured to control transmission powers of the modulation symbols generated for the respective data blocks at transmission power ratios decided between the respective data blocks;

a modulation mapper configured to select each of the plurality of data blocks one by one in a descending order of the transmission power ratio and to perform, based on a value of the modulation symbol of a currently selected data block, decision of an allocation of the modulation symbol of the currently selected data block within one or more unused resource elements to which no modulation symbol of a data block that has been previously selected in the descending order is allocated; and a channel resource element mapper configured to map the modulation symbols that have been obtained by the gain multiplexer for the plurality of data blocks into the resource element group, based on the decided allocation.

6. The transmitter according to claim 5, wherein
said resource element group is divided into a plurality of hierarchical modulation words that are units of hierarchical modulation and comprises a predetermined number of the resource elements; and
said modulation mapper is configured to:
set a data block number to one when selecting each of the plurality of data blocks one by one in a descending order of the transmission power ratio;

next, for each of the hierarchical modulation words, assign a resource element number in sequence starting from one from a top to a last of each of the hierarchical modulation words in sequence;

next, perform a symbol allocation decision process for deciding, with respect to each of modulation symbols that have been obtained for a data block corresponding to a current data block number, each position in resource elements for which the resource element number has been assigned in each of the hierarchical modulation words, the position corresponding to a value of each of the modulation symbols, as an allocation of each of the modulation symbols;

next, remove resource elements for which allocation has been decided to assign the resource element number again in sequence starting from one to the resource elements remaining in each of the hierarchical modulation words;

next, increment the data block number by one;

next, determine whether or not the data block number has reached a number of the plurality of data blocks and when it is determined that the data block number has not reached the number of the plurality of data blocks, returning control to a performance of the symbol allocation decision process, and when it is determined that the data block number has reached the maximum number of the data block, perform a next process; and next, with respect to all modulation symbols that have been obtained for a last of the data blocks, decide all of resource elements for which the resource element number has been assigned within each of the hierarchical modulation word as an allocation of the modulation symbols.

7. The transmitter according to claim 5, said modulation mapper is configured to:
set a data block number to one when selecting each of the plurality of data blocks one by one in a descending order of the transmission power ratio;

next, set a starting resource element position of hierarchical modulation to a position of a top resource element of the resource element group;

next, perform a symbol allocation decision process for deciding, with respect to modulation symbols that have been obtained for a data block corresponding to a current data block number, a position corresponding to a value of each of the modulation symbols in resource elements for which allocation has not been decided yet, with a current starting resource element position as a basis, as an allocation of each of the modulation symbols;

next, update the current starting resource element position to a next resource element position of a position to which an allocation has been decided by the symbol allocation decision process;

next, determine whether or not mapping of the modulation symbols that have been obtained for a data block corresponding to the current data block number has been done to a last of the resource element group, and when it is determined that the mapping has not been completed to the last, return control to a performance of the symbol allocation decision process, and when it is determined that the mapping has been completed to the last, perform a next process;

next, set the starting resource element position to a first resource element position for which an allocation has not been decided by performing a search from a top of the resource element group;

next, increment the data block number by one;

next, determine whether or not the data block number has reached a number of the plurality of data blocks and when it is determined that the data block number has not reached the number of the plurality of data blocks, return control to a performance of the symbol allocation decision process, and when it is determined that the data block number has reached the maximum number of the data block, perform a next process; and next, with respect to all modulation symbols that have been obtained for a last of the data blocks, decide all of resource elements for which the resource element number has been assigned within each of hierarchical modulation words as an allocation of the modulation symbols.

8. The transmitter according to claim 5, wherein
the data blocks except for a last data block in the plurality of data blocks transmit transmission information in a multimedia broadcast multicast multicast service; and
the last data block transmits transmission information in a unicast service.

* * * * *